(12) United States Patent
Fuji et al.

(10) Patent No.: US 10,275,960 B2
(45) Date of Patent: Apr. 30, 2019

(54) SECURITY SYSTEM, MANAGEMENT APPARATUS, PERMISSION APPARATUS, TERMINAL APPARATUS, SECURITY METHOD AND PROGRAM

(71) Applicant: NIPPON TELEGRAPH AND TELEPHONE CORPORATION, Chiyoda-ku (JP)

(72) Inventors: Hitoshi Fuji, Musashino (JP); Tomohide Yamamoto, Musashino (JP); Tetsutaro Kobayashi, Musashino (JP); Reo Yoshida, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 91 days.

(21) Appl. No.: 15/309,458

(22) PCT Filed: May 12, 2015

(86) PCT No.: PCT/JP2015/063571
§ 371 (c)(1),
(2) Date: Nov. 8, 2016

(87) PCT Pub. No.: WO2015/174390
PCT Pub. Date: Nov. 19, 2015

(65) Prior Publication Data
US 2017/0186255 A1  Jun. 29, 2017

(30) Foreign Application Priority Data
May 13, 2014  (JP) .................................. 2014-099198

(51) Int. Cl.
*G07C 9/00* (2006.01)
*E05B 49/00* (2006.01)
(Continued)

(52) U.S. Cl.
CPC ...... *G07C 9/00166* (2013.01); *E05B 47/0001* (2013.01); *E05B 49/00* (2013.01);
(Continued)

(58) Field of Classification Search
CPC ............ G07C 9/00166; G07C 9/00309; G07C 2009/00412; H04L 9/30; H04L 9/14;
(Continued)

(56) References Cited

U.S. PATENT DOCUMENTS 9,189,900 B1 * 11/2015 Penilla ............... G07C 9/00007
2004/0172396 A1  9/2004 Vanska et al.
(Continued)

FOREIGN PATENT DOCUMENTS

EP  2 701 124 A1  2/2014
JP  2006-283383 A  10/2006
(Continued)

OTHER PUBLICATIONS

Extended Search Report dated Dec. 6, 2017 in European Patent Application No. 15792590.0, citing documents AA, AB,AC, AD and AO therein, 8 pages.
(Continued)

*Primary Examiner* — Brian Wilson
(74) *Attorney, Agent, or Firm* — Oblon, McClelland, Maier & Neustadt, L.L.P.

(57) ABSTRACT

At the time of setting authority, a management apparatus stores a database in which authority information corresponding to authority to physically drive a drive apparatus, which is a tangible object, using a terminal apparatus, and registration identification information corresponding to a subject that is given the authority are associated, and outputs information representing any of the registration identification information; and a permission apparatus receives and stores the information. At the time of exercising the authority, the
(Continued)

terminal apparatus outputs information representing identification information, and the permission apparatus receives the information and, when the identification information corresponds to registration identification information comprised in setting information, outputs information representing authority exercise information required to exercise the authority. The terminal apparatus receives the information representing the authority exercise information and outputs a drive signal corresponding to the authority exercise information. By this drive signal, a drive apparatus, which is a tangible object, is physically driven.

8 Claims, 13 Drawing Sheets

(51) Int. Cl.
G06F 21/34 (2013.01)
G06F 21/44 (2013.01)
E05B 47/00 (2006.01)
H04L 9/14 (2006.01)
H04L 9/30 (2006.01)

(52) U.S. Cl.
CPC ............ G06F 21/34 (2013.01); G06F 21/44 (2013.01); G07C 9/00309 (2013.01); H04L 9/14 (2013.01); H04L 9/30 (2013.01); G07C 2009/00412 (2013.01)

(58) Field of Classification Search
CPC ...... E05B 47/0001; E05B 49/00; G06F 21/44; G06F 21/34
See application file for complete search history.

(56) References Cited

U.S. PATENT DOCUMENTS

| | | | |
|---|---|---|---|
| 2006/0170533 A1 | 8/2006 | Chioiu et al. | |
| 2008/0122595 A1* | 5/2008 | Yamamichi | B60R 25/2018 340/426.16 |
| 2011/0035604 A1 | 2/2011 | Habraken | |
| 2012/0323981 A1 | 12/2012 | Yamamoto et al. | |
| 2013/0318360 A1 | 11/2013 | Yamamoto et al. | |
| 2013/0339413 A1 | 12/2013 | Yamamoto et al. | |
| 2014/0232524 A1* | 8/2014 | Nakai | B60R 25/24 340/5.61 |
| 2015/0221152 A1 | 8/2015 | Andersen | |

FOREIGN PATENT DOCUMENTS

| | | |
|---|---|---|
| WO | 2011/086992 A1 | 7/2011 |
| WO | 2012/057134 A1 | 5/2012 |
| WO | 2012/121152 A1 | 9/2012 |

OTHER PUBLICATIONS

Office Action dated Mar. 28, 2017 in Japanese Patent Application No. 2016-519254 (with English translation).
Combined Chinese Office Action and Search Report dated Nov. 1, 2018, in Patent Application No. 201580024288.9 (with English translation), 21 pages.
H. Ogishi, "Implement of SAS-2 Key-free Application System," Frontier Engineering Course, Kochi University of Technology, Feb. 9, 2007, 39 pages (with English abstract).
International Search Report dated Aug. 18, 2015 in PCT/JP2015/063571 filed May 12, 2015.

* cited by examiner

SECURITY SYSTEM, MANAGEMENT APPARATUS, PERMISSION APPARATUS, TERMINAL APPARATUS, SECURITY METHOD AND PROGRAM

TECHNICAL FIELD

The present invention relates to a security technique, and more particularly to a technique for controlling authority to execute processing for a tangible object.

BACKGROUND ART

Various methods for controlling authority to execute processing for a tangible object have been considered. For example, one of methods for a manager of a certain room to control other persons' authority to execute opening/closing of the door is a method using existence/non-existence of a physical key. In this method, those who have the physical key can open the door, while those who do not have the physical key cannot open the door. That is, the authority for a person to open the door is controlled by whether the person holds the key or not. Further, a logical key (for example, a card key) obtained by combining a recording medium capable of holding electrical information and software is also proposed (for example, see Non-patent literature 1).

PRIOR ART LITERATURE

Non-Patent Literature

Non-patent literature 1: Hirokazu Ogishi, "Implement Of SAS-2 Key-free Application System", Frontier Engineering Course, Kochi University of Technology, Feb. 9, 2007

SUMMARY OF THE INVENTION

Problems to be Solved by the Invention

In conventional methods, however, there is a problem that handling of execution authority is cumbersome. For example, in the case of a physical key, the key has the function as a key forever as far as its shape is maintained. Therefore, it is cumbersome to abolish or change the authority. Further, in the case of a physical key, it is necessary to physically hand over the key itself to give the authority. In the case of a logical key also, it is necessary to physically hand over a recording medium. Therefore, it is cumbersome to give the authority. Furthermore, a user has to physically hold a plurality of keys in order to have a plurality of authorities. Therefore, it is cumbersome for the user to hold the authorities.

Such a problem is not limited to the case of managing the authority to open/close a door using a conventional physical key or logical key but is common to cases of managing other authorities using a conventional physical key or logical key.

An object of the present invention is to simplify handling of authority to execute processing for a tangible object.

Means to Solve the Problems

At the time of setting authority, a management apparatus stores a database in which authority information corresponding to authority to physically drive a drive apparatus, which is a tangible object, using a terminal apparatus, and registration identification information corresponding to a subject that is given the authority are associated, and outputs information representing any of the registration identification information; and a permission apparatus receives the information representing any of the registration identification information and stores setting information comprising any of the registration identification information.

At the time of exercising the authority, the terminal apparatus outputs information representing identification information, and the permission apparatus receives the information and, when the identification information corresponds to registration identification information comprised in setting information, outputs information representing authority exercise information required to exercise the authority. The terminal apparatus receives the information representing the authority exercise information and outputs a drive signal corresponding to the authority exercise information. By this drive signal, a drive apparatus, which is a tangible object, is physically driven.

Effects of the Invention

In the present invention, since it is possible to manage authority to execute processing for a tangible object by a database, handling of the authority to execute processing for a tangible object becomes simple.

DETAILED DESCRIPTION OF THE EMBODIMENTS

Embodiments of the present invention will be described below with reference to drawings.

First Embodiment

<Configuration>

Figure 1:
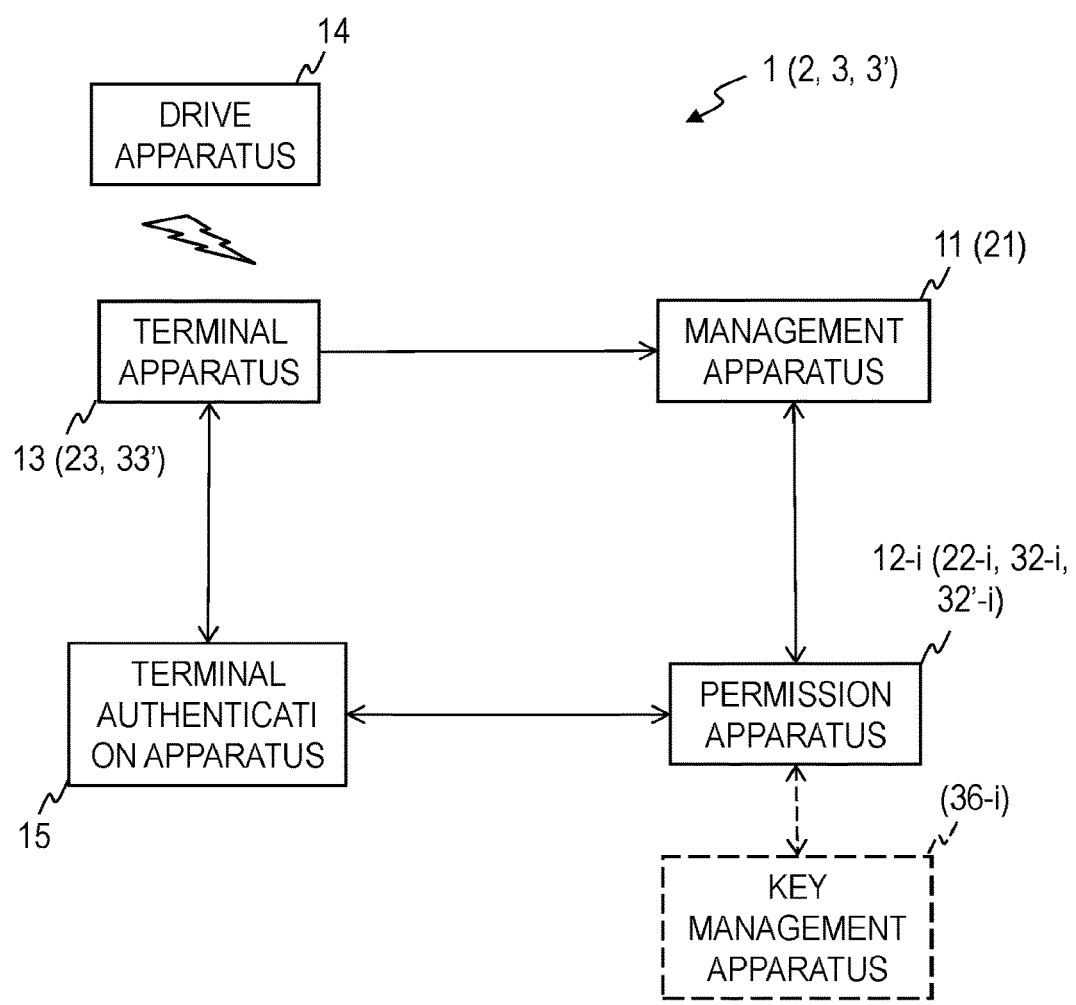
FIG. 1 is a block diagram illustrating a configuration of a security system of an embodiment.
Figure 8:
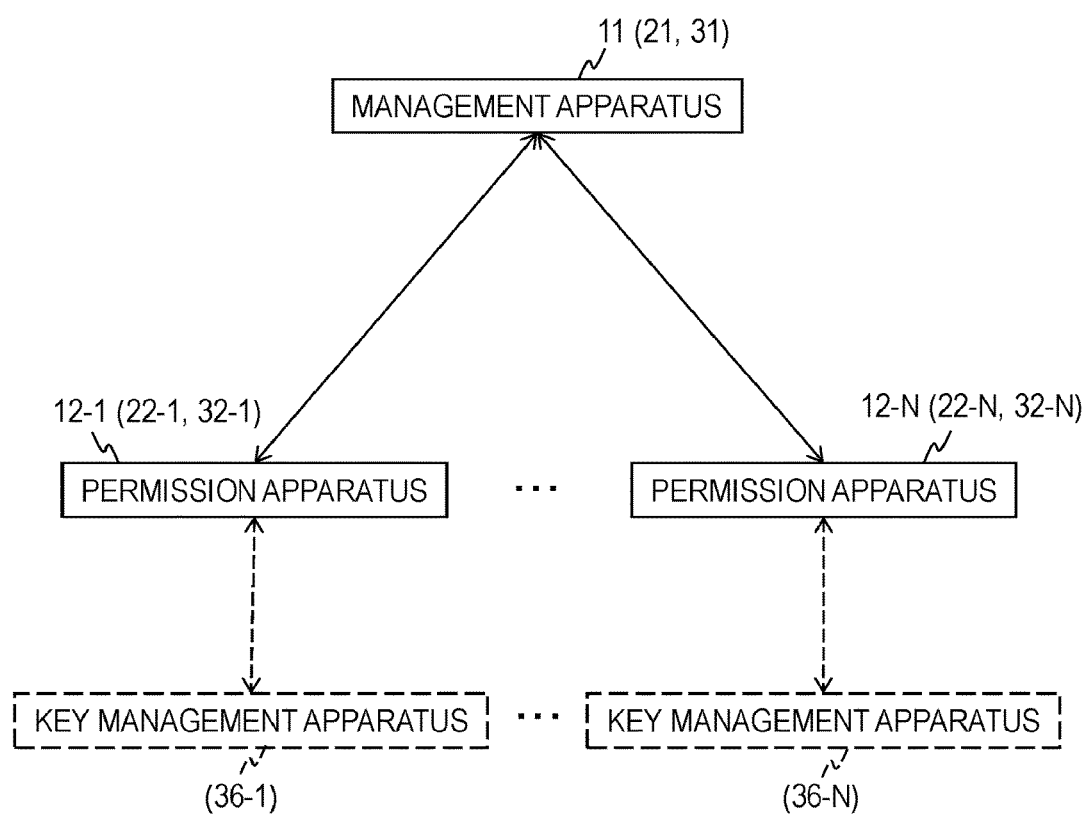
FIG. 8 is a block diagram illustrating a configuration of the embodiment.

As illustrated in FIG. 1, a security system 1 of the present embodiment includes a management apparatus 11, a permission apparatus 12-*i*, a terminal apparatus 13, a drive apparatus 14 and a terminal authentication apparatus 15. The management apparatus 11 is configured so as to be capable of performing information transmission with the permission apparatus 12-*i* and the terminal apparatus 13. The permission apparatus 12-*i* is configured so as to be capable of performing information transmission with the management apparatus 11 and the terminal authentication apparatus 15. The terminal authentication apparatus 15 is configured so as to be capable of performing information transmission with the permission apparatus 12-*i* and the terminal apparatus 13. The terminal apparatus 13 is configured so as to be capable of performing information transmission with the terminal authentication apparatus 15 and the management apparatus 11 and capable of transmitting a signal to the drive apparatus 14. Information transmission between apparatuses is performed through a network, such as the Internet, and signal transmission is performed, for example, via wireless communication, infrared communication or the like. In FIG. 1, one management apparatus 11, one permission apparatus 12-*i*, one terminal apparatus 13, one drive apparatus 14 and one terminal authentication apparatus 15 are shown for convenience of description. However, for each of them, a plurality of apparatuses may exist. That is, i=1, . . . , N; N is a positive integer, and N may be an integer equal to or larger than 2 (FIG. 8).

<<Management Apparatus 11>>

Figure 2:
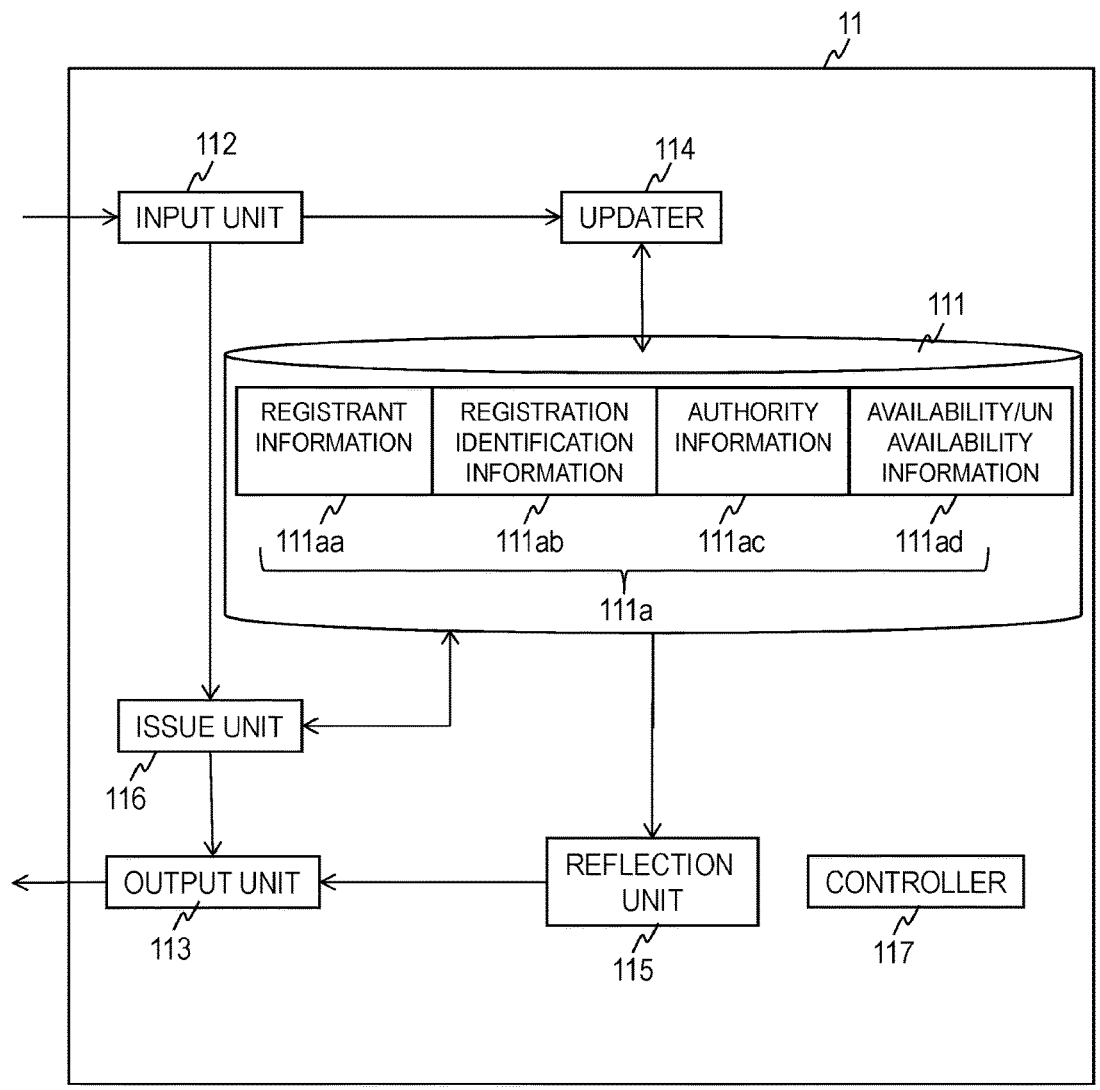
FIG. 2 is a block diagram illustrating a configuration of a management apparatus of the embodiment.

As illustrated in FIG. 2, the management apparatus 11 of the present embodiment includes a storage 111, an input unit 112, an output unit 113, an updater 114, a reflection unit 115, an issue unit 116 and a controller 117, and executes each process under the control of the controller 117. The management apparatus 11 is, for example, an apparatus configured by a general-purpose or dedicated-purpose computer provided with a processor (hardware processor) such as a CPU (central processing unit), a memory such as a RAM (random-access memory) and a ROM (read-only memory), and the like executing a predetermined program (management server application). The management server application may be installed in the computer or may be recorded in the ROM or the like in advance. Further, a part or all of processors of the management apparatus 11 may be configured not with an electronic circuitry which realizes a functional configuration by a program being read, like the CPU, but with an electronic circuitry which independently realizes processing functions.

<<Permission Apparatus 12-*i*>>

Figure 3:
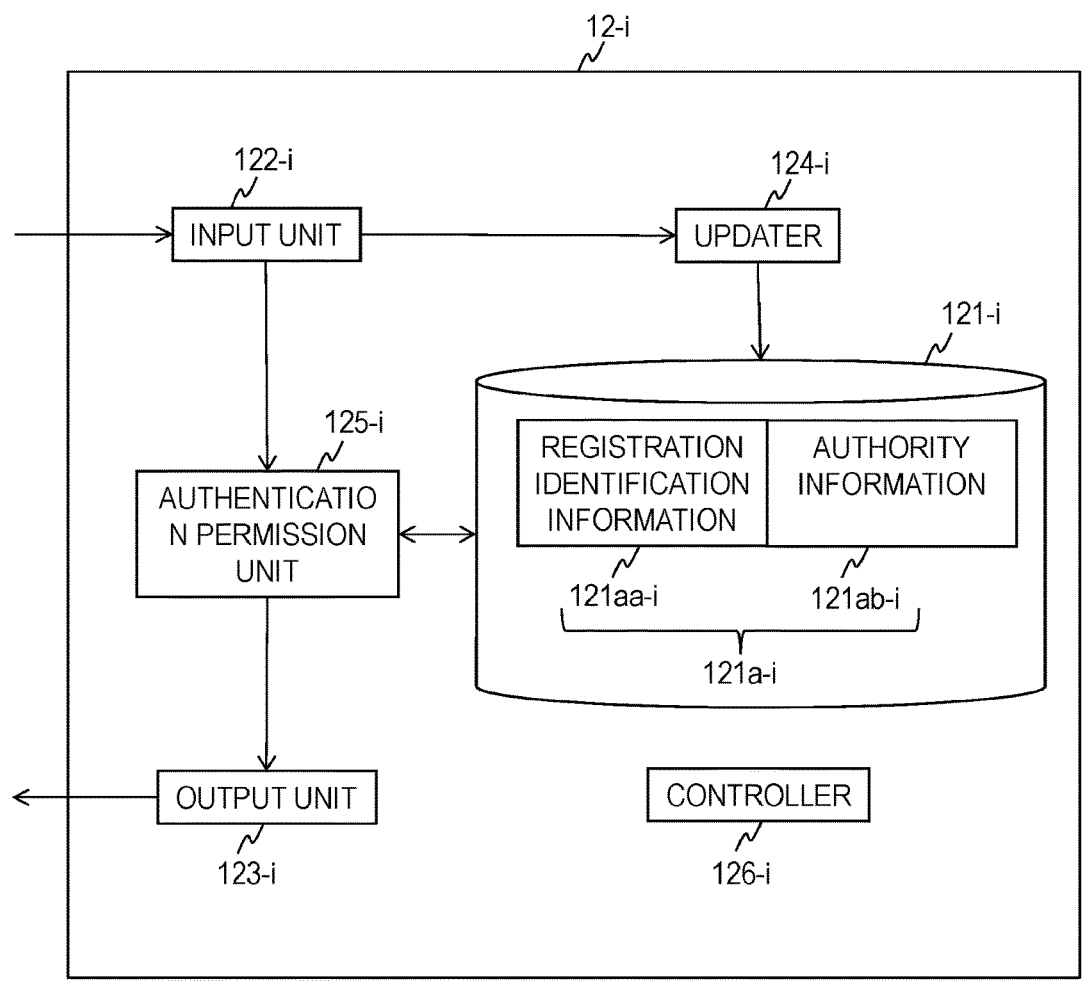
FIG. 3 is a block diagram illustrating a configuration of a permission apparatus of the embodiment.

As illustrated in FIG. 3, the permission apparatus 12-*i* of the present embodiment includes a storage 121-*i*, an input unit 122-*i*, an output unit 123-*i*, an updater 124-*i*, an authentication permission unit 125-*i* and a controller 126-*i*, and executes each process under the control of the controller 126-*i*. The permission apparatus 12-*i* is, for example, an apparatus configured by the general-purpose or dedicated-purpose computer as described above executing a predetermined program (authentication/permission server application). The authentication/permission server application may be installed in the computer or may be recorded in the ROM or the like in advance. Further, a part or all of processors of the permission apparatus 12-*i* may be configured with an electronic circuitry which independently realizes processing functions.

<<Terminal Apparatus 13>>

Figure 4:
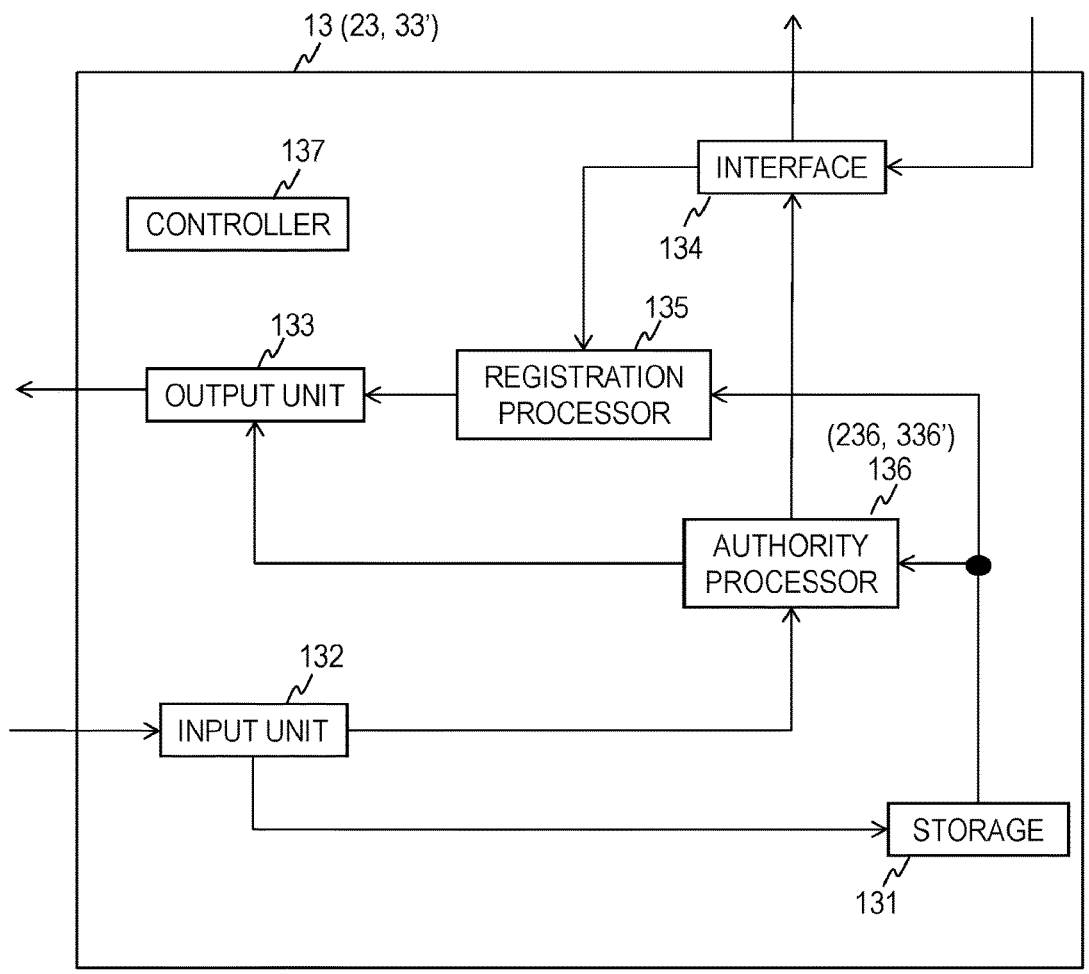
FIG. 4 is a block diagram illustrating a configuration of a terminal apparatus of the embodiment.

As illustrated in FIG. 4, the terminal apparatus 13 includes a storage 131, an input unit 132, an output unit 133, an interface 134, a registration processor 135, an authority processor 136 and a controller 137, and executes each process under the control of the controller 137. The terminal apparatus 13 is, for example, an apparatus configured by the general-purpose or dedicated-purpose computer as described above executing a predetermined program (key management application dedicated to device). The key management application dedicated to device may be installed in the computer or may be recorded in the ROM or the like in advance. Examples of the computer constituting the terminal apparatus 13 are: a mobile phone provided with a communication function, such as Felica® and NFC, a smartphone and a tablet terminal apparatus. Further, a part or all of processors of the terminal apparatus 13 may be configured with an electronic circuitry which independently realizes processing functions.

<<Terminal Authentication Apparatus 15>>

The terminal authentication apparatus 15 is an apparatus configured by the general-purpose or dedicated-purpose computer as described above executing a predetermined program (device authentication application). The device authentication application may be installed in the computer or may be recorded in the ROM or the like in advance. Further, a part or all of processors of the terminal authentication apparatus 15 may be configured with an electronic circuitry which independently realizes processing functions.

<<Drive Apparatus 14>>

The drive apparatus 14 is provided with a communication function, and it is a tangible object which is physically driven in response to a signal sent from the terminal apparatus 13. Examples of the drive apparatus 14 are: an electronic lock which locks or unlocks a door in response to a sent signal; a remote engine starter which starts and stops the engine of a car in response to a sent signal; an electronic shutter which opens or closes in response to a sent signal; and a household electric appliance which is driven or stopped in response to a sent signal. The drive apparatus 14 may be differently driven in response to a sent signal. For example, the drive apparatus 14 may perform locking and unlocking of the door of a different locker in response to a sent signal.

<Process>

Next, a process of the present embodiment will be described.

<<Registration Process>>

A registration process performed by the management apparatus 11 will be described.

It is assumed that, by a contract or the like between a subject that uses the present system (for example, a user of the terminal apparatus 13 or an apparatus) and an owner of the drive apparatus 14, the subject is given authority to drive the drive apparatus 14. Examples of the authority to drive the drive apparatus 14 are: authority to cause a door to be unlocked and locked, authority to cause the engine of a car to be started and stopped, authority to cause an electronic shutter to open and close, and authority to cause a household electric appliance to be driven and stopped. This authority may be such that is valid only during a certain period (for example, authority to cause the door of a room in a hotel to be unlocked and locked only during a lodging period) or may be such that the period is not limited (for example, authority to cause the door of a room of the subject's house to be unlocked and locked). An administrator of the management apparatus 11 issues authority information corresponding to such authority, identification information of the subject that is given the authentication, and authentication information (a login ID, a password and the like). When the same authority is given to a plurality of subjects, the same authority information is issued to a group constituted by such subjects (that is, the subjects are grouped). The identification information is information corresponding to each of such subjects, and, in principle, the same identification information is not given to mutually different subjects. However, in the case of a special situation, such as a case where a mutual relation among a plurality of subjects is high, the same identification information may be set for the plurality of subjects. An example of the identification information is a public encryption key in accordance with asymmetric key cryptography, and is, for example, a public key in accordance with public key cryptography, an ID (a telephone number, a mail address or the like) in ID-based cryptography, or a vector corresponding to an encryption key in functional cryptography. A secret decryption key corresponds to each public encryption key. For example, when a public encryption key is a public key in accordance with the public key cryptography, the secret decryption key is a secret key corresponding to the public key. When a public encryption key is an ID in the ID-based cryptography, the secret decryption key is a secret key corresponding to the ID. When a public encryption key is a vector corresponding to an encryption key in the functional cryptography, the secret decryption key is a secret key corresponding to the vector. The identification information may comprise a public encryption key in accordance with the asymmetric key cryptography and other information.

Registrant information 111aa corresponding to a name and authentication information of the subject that is given the authority as described above, authority information 111ac corresponding to the authority (authority information corresponding to authority to physically drive a drive apparatus, which is a tangible object, using a terminal apparatus), and registration identification information 111ab which is identification information issued to this subject (registration identification information corresponding to the subject that is given the authority) are inputted to the input unit 112 of the management apparatus 11 (FIG. 2) and sent to the updater 114. The updater 114 adds a record in which the registrant information 111aa, the registration identification information 111ab, the authority information 111ac which have been sent and availability/unavailability information 111ad are associated, to a database 111a. The availability/unavailability information 111ad is information representing whether or not to permit a subject corresponding to the registration identification information 111ab associated with the availability/unavailability information 111ad to exercise an authority corresponding to the authority information 111ac (information representing whether it is possible or impossible to exercise authority corresponding to authority information). At the time of a registration process, the availability/unavailability information 111ad representing permission to exercise authority may be set, or the availability/unavailability information 111ad representing rejection to exercise the authority may be set. As described above, the database 111a in which the registrant information 111aa, the registration identification information 111ab, the authority information 111ac and the availability/unavailability information 111ad are associated is stored in the storage 111.

[Illustration of Data Configuration of Database 111a]

Figure 9A:
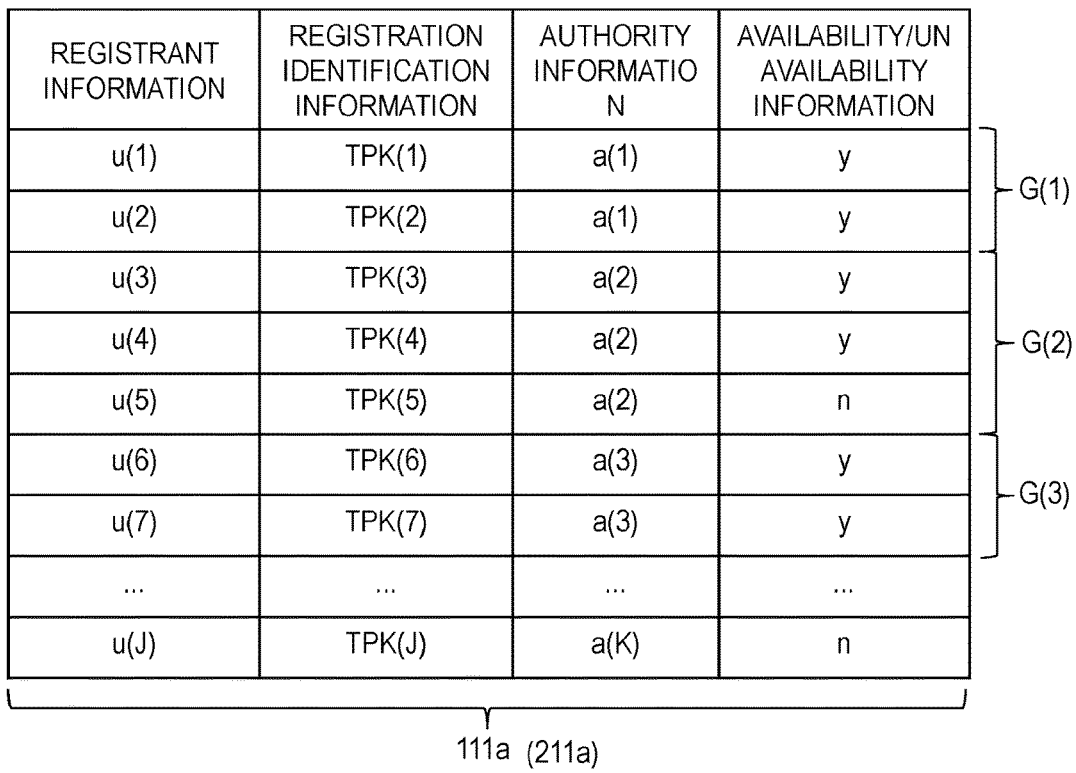
FIGS. 9A to 9C are conceptual diagrams illustrating a configuration of a database of the embodiment.

FIG. 9A illustrates a data configuration of the database 111a. In the example of FIG. 9A, a plurality of pieces of registrant information 111aa (that is, u(1), . . . , u(J)), a plurality of pieces of registration identification information 111ab (that is, TPK(1), . . . , TPK(J)), a plurality of pieces of authority information 111ac (that is, a(1), . . . , a(K)), and a plurality of pieces of availability/unavailability information 111ad (that is, y and n) are associated in the database 111a. Here, J and K are integers equal to or larger than 2. Here, u(j), which is registrant information 111aa of a subject A(j) (j=1, . . . , J), and TPK(j), which is registration identification information 111ab issued to this subject A(j), are associated one to one. TPK(j) in this example represents a public encryption key. In this example, the same authority is given to a plurality of subjects as stated before, and the same authority information is issued to a group constituted by such subjects. For example, a(1) is issued to a group G(1) constituted by subjects A(1) and A(2); a(2) is issued to a group G(2) constituted by subjects A(3), A(4) and A(5); and a(3) is issued to a group G(3) constituted by subjects A(6) and A(7). Therefore, the same a(1) is associated with TPK(1) and TPK(2); the same a(2) is associated with TPK(3), TPK(4) and TPK(5); and the same a(3) is associated with TPK(6) and TPK(7). Availability/unavailability information 111ad of "y" represents permission to exercise authority, and availability/unavailability information 111ad of "n" represents rejection to exercise authority.

Further, authentication information is stored in the storage 131 of the terminal apparatus 13 (FIG. 4) which a subject corresponding to the authentication information uses. When identification information corresponding to this subject comprises a public encryption key in accordance with the asymmetric key cryptography, a secret decryption key corresponding to the public encryption key is also stored in the storage 131. In the case of the example of the database 111a in FIG. 9A, a secret decryption key TSK(j) corresponding to TPK(j) is stored in the storage 131 of the terminal apparatus 13 of the subject A(j).

Figure 5:
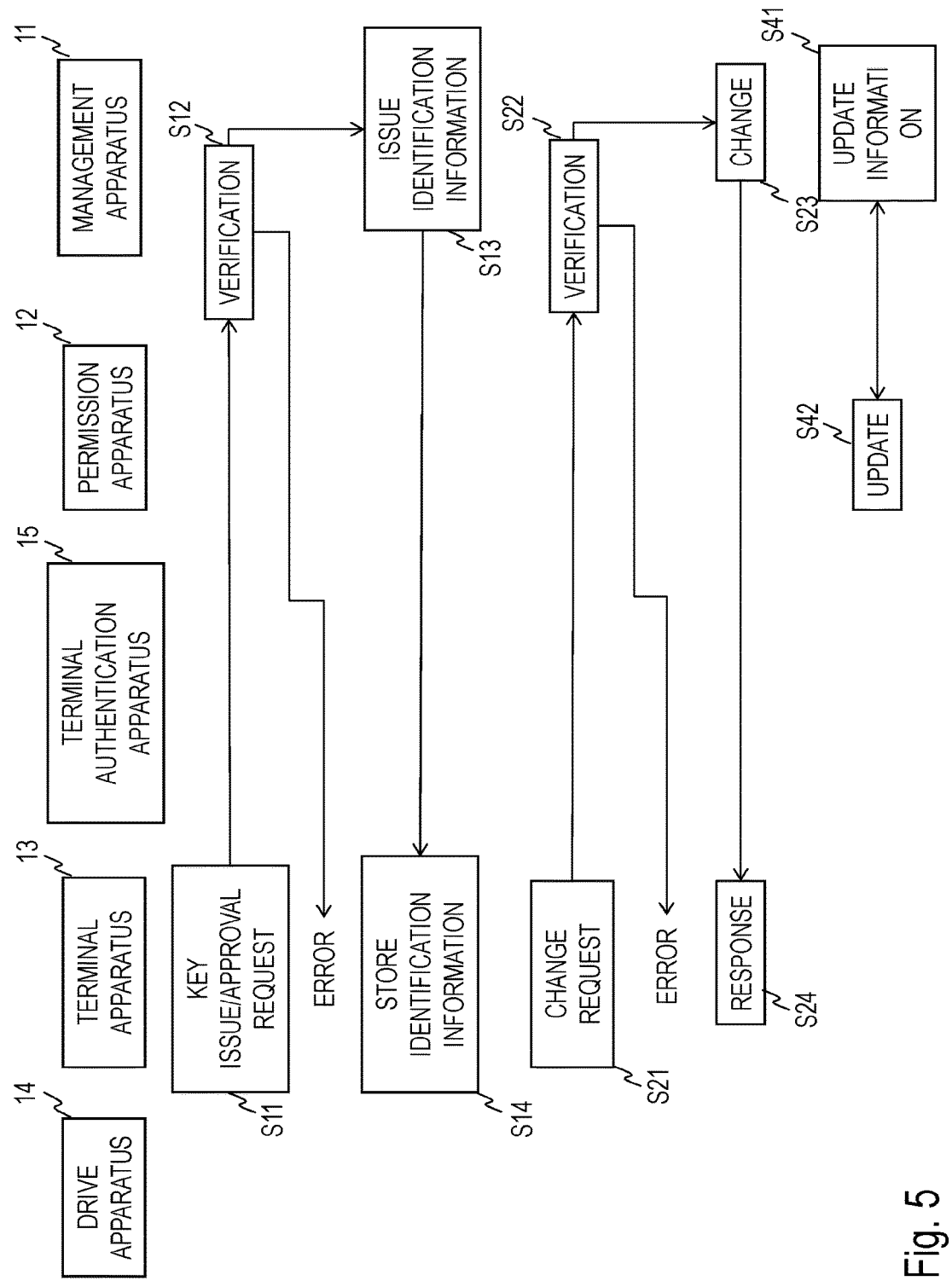
FIG. 5 is a flow chart for illustrating a process of the embodiment.

<<Identification Information Issue Process: FIG. 5>>

An identification information issue process is executed at the time of initially using the terminal apparatus 13, after re-installing the key management application dedicated to device, or after the above-stated registration process is executed for authority of the user of the terminal apparatus 13. First, authentication information read out from the storage 131 is sent to the registration processor 135. The registration processor 135 generates a key issue/approval request which comprises this authentication information and sends the key issue/approval request to the output unit 133. The output unit 133 transmits the key issue/approval request to the management apparatus 11 (step S11).

The key issue/approval request is inputted to the input unit 112 of the management apparatus 11 (FIG. 2) and sent to the issue unit 116. The issue unit 116 verifies the authentication information comprised in the key issue/approval request using the registrant information 111 as stored in the database 111a of the storage 111 (step S12). When this verification fails, the issue unit 116 terminates the process with an error. On the other hand, when this verification is successful, the issue unit 116 refers to the database 111a of the storage 111 and extracts (one piece or a plurality of pieces of) registration identification information 111ab associated with registrant information 111aa corresponding to the authentication information comprised in the key issue/approval request. The issue unit 116 generates issue information (information representing registration identification information) which comprises the extracted registration identification information 111ab and sends the issue information to the output unit 113. The output unit 113 transmits the issue information to the terminal apparatus 13 (step S13). The issue information is inputted to the input unit 132 of the terminal apparatus 13 (FIG. 4), and the registration identification information 111ab comprised in the issue information is stored into the storage 131 as identification information (step S14).

<<Change Process Performed Between Management Apparatus and Terminal Apparatus: FIG. 5>>

A change process performed between the management apparatus 11 and the terminal apparatus 13 will be described. The change process is a process for changing the database 111a stored in the storage 111 of the management apparatus 11. Examples of the change process are: a process for deleting (abolishing) any record in the database 111a, and a process for changing setting of the availability/unavailability information 111ad.

First, change information representing the content of change in the database 111a is inputted to the interface 134 of the terminal apparatus 13 (FIG. 4). Examples of the content of change in the database 111a are: abolishment of registration, change in the availability/unavailability information 111ad representing permission to exercise authority, and change in the availability/unavailability information 111ad representing rejection to exercise authority. The change information is sent to the registration processor 135. Furthermore, identification information and authentication information are read out from the storage 131 and sent to the registration processor 135. The registration processor 135 generates a change request which comprises the change information, the identification information and the authentication information and sends the change request to the output unit 133. The output unit 133 transmits the change request to the management apparatus 11 (step S21).

The change request (which comprises the change information representing the content of change in the database) is inputted to (received by) the input unit 112 of the management apparatus 11 (FIG. 2) and sent to the updater 114. The updater 114 verifies the authentication information comprised in the change request, using the registrant information 111aa stored in the database 111a of storage 111 (step S22). When this verification fails, the updater 114 terminates the process with an error. On the other hand, when this verification is successful, the updater 114 uses the change information and the identification information comprised in the change request to perform change represented by the change information for a record of the database 111a corresponding to the identification information. For example, when the change information represents "abolishment of registration", the updater 114 deletes the record corresponding to the same registration identification information 111ab as the identification information (a record constituted by the registrant information 111aa, the registration identification information 111ab, authority information 111ac and availability/unavailability information 111ad) from the database 111a. For example, when the change information is "change in the availability/unavailability information 111ad representing permission to exercise authority", the updater 114 causes availability/unavailability information 111ad associated with the same registration identification information 111ab as the identification information to be what represents "permission to exercise authority". For example, when the change information is "change in the availability/unavailability information 111ad representing rejection to exercise authority", the updater 114 causes the availability/unavailability information 111ad associated with the same registration identification information 111ab as the identification information to be what represents "rejection to exercise authority". As described above, the updater 114 updates the database 111a using the change information (step S23). The reflection unit 115 sends a response which comprises information representing that the change has been performed and information representing a record of the latest database 111a corresponding to the identification information comprised in the change request, to the output unit 113, and the output unit 113 transmits this response to the terminal apparatus 13 (step S24).

<<Change Process Performed Only by Management Apparatus>>

The change process as described above may be performed by the management apparatus 11 independently. In this case, the administrator or the like of the management apparatus 11 inputs the change information and the identification information as stated above to the input unit 112 of the management apparatus 11. These are sent to the updater 114, and the updater 114 performs the change represented by the change information in the record of the database 111a corresponding to the identification information.

<<Reflection Process Performed Between Management Apparatus and Permission Apparatus: FIG. 5>>

A part of information stored in the database 111a of the management apparatus 11 is stored in the permission apparatus 12-i (FIG. 3). For example, at least a part of the registration identification information 111ab comprised in the database 111a is stored in the storage 121-i of the permission apparatus 12-i. In the present embodiment, among the authorities stated above, registration identification information 111ab associated only with authority information 111ac corresponding to authorities (a part of the authorities) handled by the permission apparatus 12-i (information representing first partial registration identification information, which is registration identification information associated with first partial authority information) is stored in the permission apparatus 12-i. As a specific example, for example, such a case is assumed that records corresponding to authorities to unlock and lock the door of each room of hotels A, B and C, respectively, are stored in the database 111a of the management apparatus 11, and the permission apparatus 12-i handles only the authority to unlock and lock the door of each room of the hotel A. In this case, the permission apparatus 12-i stores registration identification information 111ab associated with authority information 111ac corresponding to the authority to unlock and lock the door of each room of the hotel A, in the storage 121-i. Furthermore, for example, only registration identification information 111ab associated with the availability/unavailability information 111ad representing permission to exercise authority, among records of the database 111a of the management apparatus 11, may be stored in the permission apparatus 12-i. In addition to such registration identification information 111ab, other information (authority information 111ac and the like) associated with the registration identification information 111ab may be also stored in the permission apparatus 12-i. An example will be shown below in which, among pieces of registration identification information 111ab associated with the authority information 111ac corresponding to the authorities handled by the permission apparatus 12-i, registration identification information 111ab associated with the availability/unavailability information 111ad representing permission to exercise authority, and authority information 111ac associated with the registration identification information 111ab are stored in the permission apparatus 12-i.

A process for storing such information into the permission apparatus 12-i may be started, for example, by the management apparatus 11 when any of addition of, discard of and change in availability/unavailability information about a record of the database 111a of the management apparatus 11 has occurred (a reflection method 1). Otherwise, the permission apparatus 12-*i* inquires of the management apparatus 11 whether any of addition of, discard of and change in availability/unavailability information about a record of the database 111*a* has occurred, by a predetermined trigger, and the process may be started by the permission apparatus 12-*i* when any of them has occurred (a reflection method 2).

<<Reflection Method 1>>

In the case of the reflection method 1, the reflection unit 115 of the management apparatus 11 (FIG. 2) monitors addition of, discard of and change in availability/unavailability information about the records of the database 111*a* of the storage 111. When any of addition of, discard of and change in availability/unavailability information has occurred in records of the database 111*a*, the reflection unit 115 identifies records corresponding to authority information 111*ac* corresponding to the authorities handled by the permission apparatus 12-*i* among the records in which any of addition of, discard of and change in availability/unavailability information has occurred.

(Process 1) In the case of addition of a record, the reflection unit 115 extracts registration identification information 111*ab* and authority information 111*ac* associated with the availability/unavailability information 111*ad* representing permission to exercise authority, from among the records identified as described above. The reflection unit 115 obtains update information which comprises information representing addition of the record and the extracted registration identification information 111*ab* and authority information 111*ac* ("information representing registration identification information associated with availability/unavailability information representing permission to exercise authority" and "information corresponding to update of database") and sends the update information to the output unit 113.

(Process 2) In the case of discard of a record, the reflection unit 115 extracts registration identification information 111*ab* associated with the availability/unavailability information 111*ad* representing permission to exercise authority, from among the records identified as described above. The reflection unit 115 obtains update information which comprises information representing deletion of the record and the extracted registration identification information 111*ab* ("information representing registration identification information associated with availability/unavailability information representing permission to exercise authority" and "information corresponding to update of database") and sends the update information to the output unit 113.

(Process 3) In the case where availability/unavailability information in a record has been changed to what represents "permission to exercise authority", the reflection unit 115 extracts registration identification information 111*ab* and authority information 111*ac* from among the records identified as described above. The reflection unit 115 obtains update information which comprises information representing addition of the record and the extracted registration identification information 111*ab* and authority information 111*ac* ("information representing registration identification information associated with availability/unavailability information representing permission to exercise authority" and "information corresponding to update of database") and sends the update information to the output unit 113.

(Process 4) In the case where availability/unavailability information in a record has been changed to what represents "rejection to exercise authority", the reflection unit 115 extracts registration identification information 111*ab* from among the records identified as described above. The reflection unit 115 obtains update information which comprises information representing deletion of the record and the extracted registration identification information 111*ab* ("information representing registration identification information" and "information corresponding to update of database") and sends the update information to the output unit 113.

The output unit 113 transmits the update information as stated above to the permission apparatus 12-*i* (step S41).

The update information ("information representing registration identification information" and "information representing the content of change in setting information") is inputted to (received by) the input unit 122-*i* of the permission apparatus 12-*i* (FIG. 3) and sent to the updater 124-*i*.

(Process A) In the case where the update information comprises the information representing addition of a record (corresponding to (Process 1) and (Process 3)), the updater 124-*i* causes the registration identification information 111*ab* and the authority information 111*ac* comprised in this update information to be registration identification information 121*aa*-*i* and authority information 121*ab*-*i*, and stores a record in which the registration identification information 121*aa*-*i* and the authority information 121*ab*-*i* are associated, into a database 121*a*-*i* (setting information) of the storage 121-*i*.

(Process B) In the case where the update information comprises the information representing deletion of a record (corresponding to (Process 2) and (Process 4)), the updater 124-*i* deletes a record of registration identification information 121*aa*-*i* corresponding to the registration identification information 111*ab* comprised in this update information, from the database 121*a*-*i*.

As described above, the database 121*a*-*i* is updated by the update information (step S42).

<<Reflection Method 2>>

In the case of the reflection method 2, the updater 124-*i* of the permission apparatus 12-*i* (FIG. 3) inquires of the reflection unit 115 of the management apparatus 11 whether any of addition of, discard of and change in availability/unavailability information about a record of the database 111*a* has occurred by a predetermined trigger. This inquiry is performed with the use of information which comprises the authority information 111*ac* corresponding to the authorities handled by the permission apparatus 12-*i*. The reflection unit 115 judges whether any of addition of, discard of and change in availability/unavailability information has occurred in the records corresponding to the authority information 111*ac* corresponding to the authorities handled by the permission apparatus 12-*i* after the previous inquiry made from the permission apparatus 12-*i*. When any of addition of, discard of and change in availability/unavailability information has occurred, the reflection unit 115 identifies such a record and executes (Process 1) to (Process 4) stated above according to whether the record has been added, whether the record has been discarded, whether the availability/unavailability information about the record has been changed to what represents "permission to exercise authority," or whether the availability/unavailability information about the record has been changed to what represents "rejection to exercise authority". The output unit 113 transmits update information obtained thereby to the permission apparatus 12-*i* (step S41). The update information is inputted to the input unit 122-*i* of the permission apparatus 12-*i* and sent to the updater 124-*i*. The updater 124-*i* executes (Process A) or (Process B) according to whether the update information comprises information representing addition of the record or information representing deletion of the record, and updates the database 121a-i (step S42).

<<Illustration of Database 121a-i Stored in Permission Apparatus 12-i>>

As described above, the management apparatus 11 outputs information representing any of registration identification information comprised in the database 111a, and the permission apparatus 12-i receives the information representing any of the registration identification information and stores setting information which comprises any of the registration identification information. A configuration of the database 121a-i stored in the permission apparatus 12-i will be illustrated below.

Figure 9B:
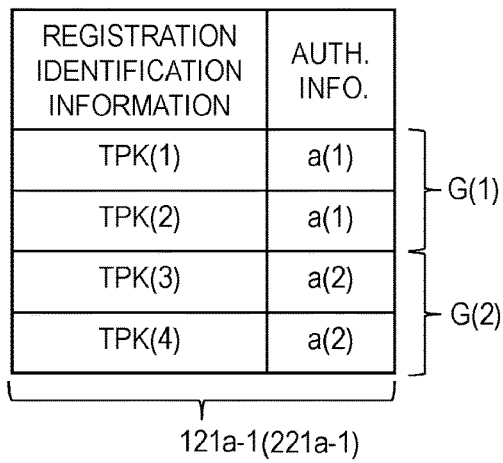

FIG. 9B illustrates a database 121a-1 stored in a permission apparatus 12-1. The permission apparatus 12-1 in this example receives authority information a(1) (first partial authority information which is authority information corresponding to a part of the authorities handled by the permission apparatus 12-1) issued to a group G(1), ..., and TPK(1) and TPK (2) associated with availability/unavailability information y (see FIG. 9A) (first partial registration identification information which is registration identification information associated with the first partial authority information) among pieces of registration identification information associated with the authority information a(1). Furthermore, this permission apparatus 12-1 receives authority information a(2) issued to a group G(2) (first partial authority information which is authority information corresponding to a part of the authorities handled by the permission apparatus 12-1) and TPK(3) and TPK (4) associated with the availability/unavailability information y (first partial registration identification information which is registration identification information associated with the first partial authority information) among pieces of registration identification information associated only with the authority information a(2). The permission apparatus 12-1 stores the database 121a-1 (setting information) in which TPK(1) and TPK(2) are associated with the authority information a(1), ..., and TPK(3) and TPK(4) are associated with the authority information a(2), into a storage 121-1.

Figure 9C:
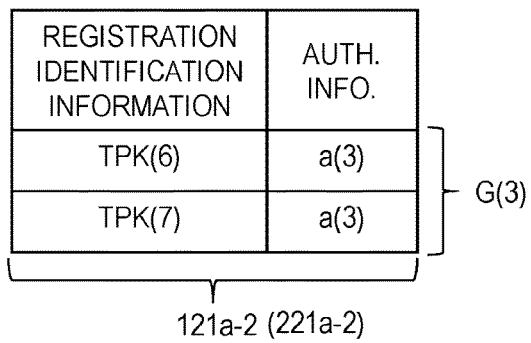

FIG. 9C illustrates a database 121a-2 stored in a permission apparatus 12-2. The permission apparatus 12-2 in this example receives authority information a(3) (second partial authority information which is authority information corresponding to a part of the authorities handled by the permission apparatus 12-2) issued to a group G(3), and TPK(6) and TPK (7) associated with the availability/unavailability information y (second partial registration identification information which is registration identification information associated with the second partial authority information) among pieces of registration identification information associated only with the authority information a(3). The permission apparatus 12-2 stores the database 121a-2 in which TPK(6) and TPK(7) are associated with the authority information a(3) into a storage 121-2.

That is, the permission apparatus 12-1 receives information representing the pieces of first partial registration identification information TPK(1), TPK(2), TPK(3) and TPK(4), which are elements of a first proper subset SUB(1)={TPK(1), TPK(2), TPK(3), TPK(4)} of a universal set SET={TPK(1), ..., TPK(J)}; constituted by a plurality of pieces of registration identification information TPK(1), ..., TPK(J), and stores the database 121a-1 (setting information) which comprises the first partial registration identification information TPK(1), TPK(2), TPK(3) and TPK(4). The permission apparatus 12-2 receives information representing the pieces of second partial registration identification information TPK(6) and TPK(7), which are elements of a second proper subset SUB(2)={TPK(6), TPK(7)} of the universal set SET and stores the database 121a-2 (setting information) which comprises the second partial registration identification information TPK(6) and TPK(7). Here, an intersection of the first proper subset SUB(1) and the second proper subset SUB(2) is empty (SUB(1)∩SUB(2) is an empty set). Further, the first partial authority information a(1) and a(2), which are authority information associated with the first partial registration identification information TPK(1), TPK(2), TPK(3) and TPK(4), and the first partial authority information a(3), which is authority information associated with the second partial registration identification information TPK(6) and TPK(7), are mutually different.

Figure 6:
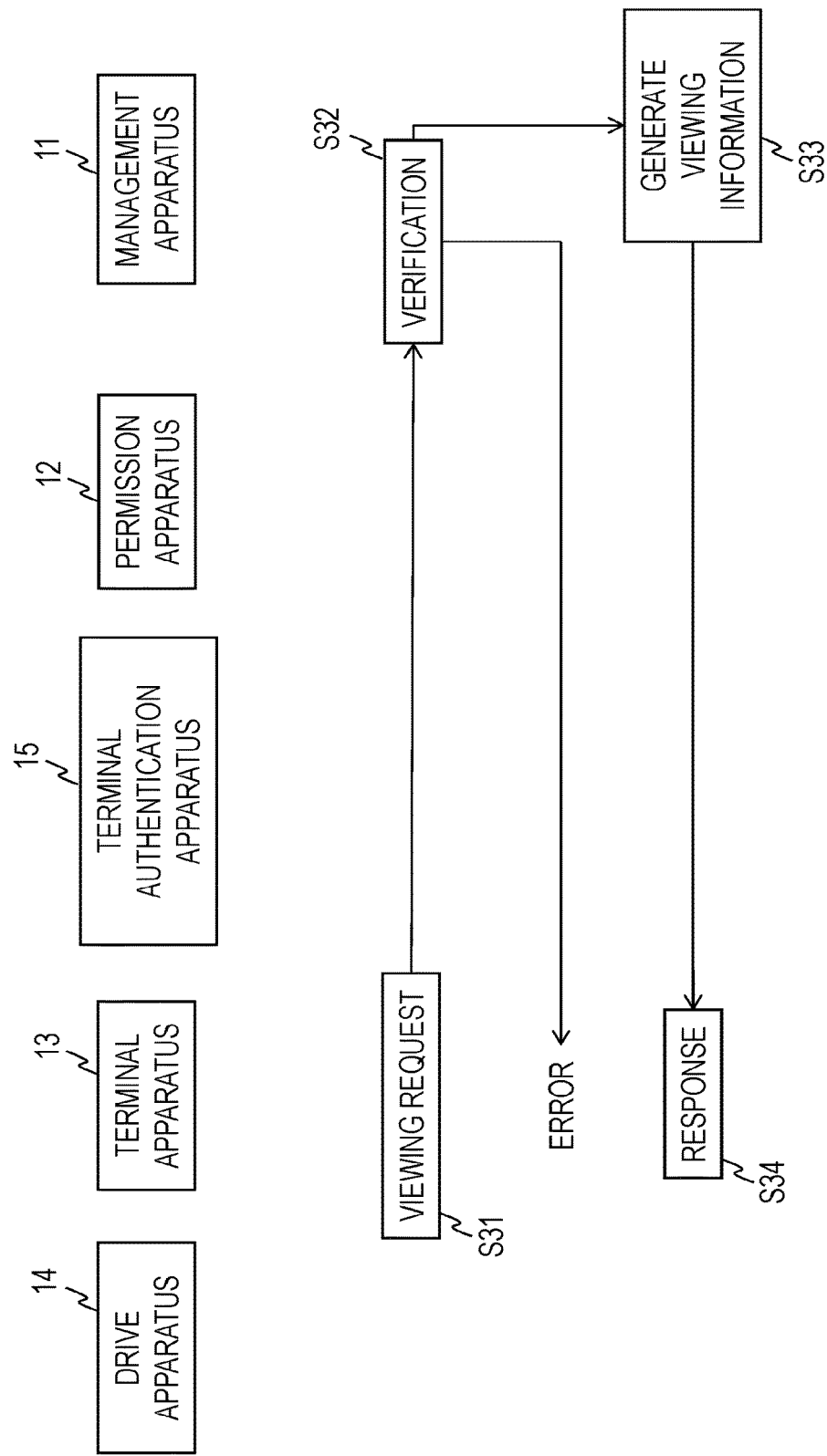
FIG. 6 is a flow chart for illustrating a process of the embodiment.

<<Viewing Process Performed Between Management Apparatus and Terminal Apparatus: FIG. 6>>

A viewing process performed between the management apparatus 11 and the terminal apparatus 13 will be described. The viewing process is a process for viewing a record of the database 111a stored in the storage 111 of the management apparatus 11, on the terminal apparatus 13.

First, viewing request information to the effect that viewing of a record of the database 111a is requested, is inputted to the interface 134 of the terminal apparatus 13 (FIG. 4). The viewing request information is sent to the registration processor 135. Furthermore, identification information and authentication information are read out from the storage 131 and sent to the registration processor 135. The registration processor 135 generates a viewing request which comprises the viewing request information, the identification information and the authentication information, and sends the viewing request to the output unit 133. The output unit 133 transmits the viewing request to the management apparatus 11 (step S31).

The viewing request is inputted to (received by) the input unit 112 of the management apparatus 11 (FIG. 2) and sent to the issue unit 116. The issue unit 116 verifies the authentication information comprised in the viewing request using the registrant information 111aa stored in the database 111a of storage 111 (step S32). When this verification fails, the issue unit 116 terminates the process with an error. On the other hand, when this verification is successful, the issue unit 116 uses the identification information comprised in the viewing request to extract a record of the database 111a corresponding to the identification information, generates viewing information representing this record, and sends the viewing information to the output unit 113 (step S33). The output unit 113 sends a response which comprises the viewing information to the output unit 113, and the output unit 113 transmits this response to the terminal apparatus 13 (step S34). Thereby, the user of the terminal apparatus 13 can view the viewing information comprised in the sent response.

Figure 7:
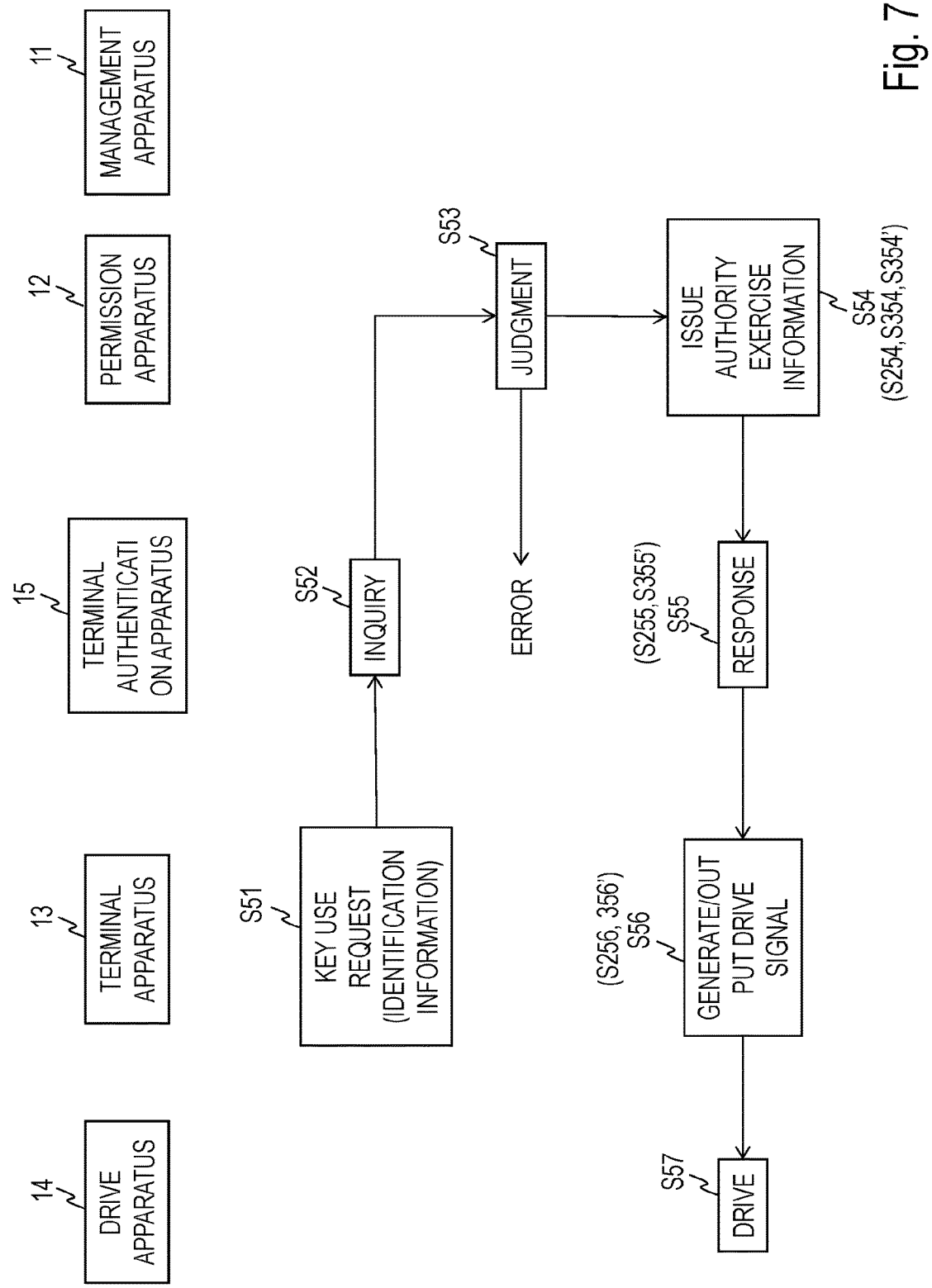
FIG. 7 is a flow chart for illustrating a process of the embodiment.

<<Key Use Process: FIG. 7>>

The terminal apparatus 13 where the identification information has been stored into the storage 131 by the identification information issue process stated before can exercise authority to physically drive the drive apparatus 14. In this case, the authority processor 136 of the terminal apparatus 13 extracts the identification information from the storage 131, generates a key use request (information representing the identification information) which comprises the identification information and sends the key use request to the output unit 133. When a plurality of pieces of identification information are stored in the storage 131, for example, information about which identification information is to be used is inputted to the interface 134, and, thereby, a key use request which comprises specified identification information is generated. Otherwise, for each of the plurality of pieces of identification information stored in the storage 131, a key use request which comprises the identification information may be generated. The output unit 133 transmits the key use request to the terminal authentication apparatus 15 (step S51).

The terminal authentication apparatus 15 to which the key use request has been sent sends the key use request to the permission apparatus 12-$i$ to make an inquiry. The key use request may be sent to all permission apparatuses 12-$i$ or may be sent only to a part of the permission apparatuses 12-$i$ (for example, permission apparatuses 12-$i$ which handle authority that the terminal apparatus 13 is going to exercise) (step S52). The key use request (the information representing the identification information) is inputted to (received by) the input unit 122-$i$ of the permission apparatus 12-$i$ (FIG. 3) and sent to the authentication permission unit 125-$i$. The authentication permission unit 125-$i$ refers to the database 121$a$-$i$ (setting information) of the storage 121-$i$ and judges whether the identification information comprised in the key use request corresponds to (for example, matches) registration identification information 121$aa$-$i$ comprised in the database 121$a$-$i$ (step S53). When the identification information does not correspond to registration identification information 121$aa$-$i$ comprised in the database 121$a$-$i$, the authentication permission unit 125-$i$ returns an error. When the identification information corresponds to registration identification information 121$aa$-$i$ (partial registration identification information) comprised in the database 121$a$-$i$ (setting information), the authentication permission unit 125-$i$ outputs information representing authority exercise information (authority exercise information required to exercise authority corresponding to the partial authority information) required to exercise authority represented by authority information 121$ab$-$i$ (partial authority information) associated with the registration identification information 121$aa$-$i$. The authority exercise information may be, for example, information representing that it is possible to exercise authority or secret information such as a password which is requested to be inputted when a right is exercised. Further, when the identification information or the registration identification information is a public encryption key in accordance with the asymmetric key cryptography, the authentication permission unit 125-$i$ may use the registration identification information 121$aa$-$i$ corresponding to the identification information as a public encryption key to encrypt secret information required for exercise the authority, and cause the obtained ciphertext to be the authority exercise information. The authority exercise information is inputted to the output unit 123-$i$, and the output unit 123-$i$ transmits the authority exercise information to the permission apparatus 12-$i$ (step S54). The terminal authentication apparatus 15 transmits an error or the authority exercise information to the terminal apparatus 13 as a response (step S55).

The response (information representing an error or the authority exercise information) is inputted to (received by) the input unit 132 of the terminal apparatus 13 (FIG. 4) and sent to the authority processor 136. When the authority exercise information is sent, the authority processor 136 generates drive information corresponding to the authority exercise information and sends the drive information to the interface 134. For example, when the authority exercise information is information representing that it is possible to exercise authority or secrete information, information representing the authority exercise information is the drive information. When the ciphertext obtained by encrypting secret information required to exercise authority by using the registration identification information 121$aa$-$i$ as a public encryption key is the authority exercise information, the authority processor 136 extracts a secret decryption key corresponding to this public encryption key from the storage 131, and causes the secret information obtained by decrypting the authority exercise information using this secret decryption key to be the drive information. The interface 134 generates and outputs a drive signal representing the inputted drive information. The drive signal is a signal for causing the drive apparatus 14, which is a tangible object, to be physically driven (step S56).

When the drive signal is inputted to the drive apparatus 14, the drive apparatus 14 is physically driven. For example, the drive apparatus 14 performs unlocking and locking of a door, causes the engine of a car to start and stop, causes an electronic shutter to open and close, and causes a household electric appliance to be driven and stopped (step S57).

Characteristics of the Present Embodiment

In the present embodiment, it is possible to simplify handling of authority to execute processing for a tangible object.

That is, in the present embodiment, such a terminal apparatus 13 that an authorized user has formally received issue of identification information can receive issue of authority exercise information from the permission apparatus 12-$i$ not via the administrator of the management apparatus 11 but directly, and can physically drive the drive apparatus 14 using the authority exercise information. On the other hand, a terminal apparatus which has not received issue of the identification information cannot receive issue of the authority exercise information from the permission apparatus 12-$i$. Therefore, it does not happen that a person who is not supposed by the administrator of the management apparatus 11 illegally exercises authority. Especially, when the identification information comprises a public encryption key in accordance with the asymmetric key cryptography, and the authority exercise information is ciphertext obtained by encrypting secret information required to exercise authority with registration identification information corresponding to the identification information, and the drive signal is a signal representing the secret information obtained by decrypting the authority exercise information with a secrete decryption key corresponding to the public encryption key, the safety level is higher. It is because, even if a third-party apparatus which does not have the secret decryption key acquires the authority exercise information, the third-party apparatus cannot exercise the authority.

Further, when an authorized user loses the terminal apparatus 13 or has the terminal apparatus 13 stolen, a record corresponding to identification information stored in the terminal apparatus 13 can be discarded from the database 111$a$ of the management apparatus 11, or availability/unavailability information of the record can be changed to what represents "rejection to exercise authority". Thereby, a corresponding record is also deleted from the database 121$a$-$i$ of the permission apparatus 12-$i$. As a result, the terminal apparatus 13 lost or stolen can be disabled, and exercise of authority using the terminal apparatus 13 can be stopped.

Further, using the terminal apparatus 13, the user can directly access the management apparatus 11 not via an operation by the administrator of the management apparatus 11 to disable or abolish exercise of predetermined authority.

Further, the administrator of the management apparatus 11 can directly access the management apparatus 11 to disable or abolish exercise of predetermined authority.

Further, the database 111a stored in the management apparatus 11 can perform partial update such as addition of, discard of, change in availability/unavailability information 111ad about a record (a record in which registrant information 111aa, registration identification information 111ab, authority information 111ac and availability/unavailability information 111ad are associated). When the database 111a is partially updated, update information is sent only to a permission apparatus 12-i which handles authority corresponding to an updated record. The permission apparatus 12-i to which the update information has been sent updates (overwrites) the database 121a-i based on the update information. Here, the management apparatus 11 handles update of records corresponding to all the permission apparatuses 12-i. On the other hand, each permission apparatus 12-i updates the database 121a-i based on sent update information only when a record corresponding to authority the permission apparatus 12-i itself handles is updated. Therefore, the number of times of updating the database 111a stored in the management apparatus 11 is larger than the number of times of updating the database 121a-i stored in the permission apparatus 12-i. On the other hand, though it is necessary to refer to the database 121a-i stored in the permission apparatus 12-i each time the key use process is performed, it is not necessary to refer to the database 111a stored in the management apparatus 11 in this case. Thus, in the present embodiment, the role of the management apparatus 11 and the role of the permission apparatus 12-i are clearly distinguished. Thereby, the database 111a of the management apparatus 11 and the database 121a-i of the permission apparatus 12-i can be implemented in configurations optimal for their respective roles. For example, it is possible to implement the database 111a of the management apparatus 11 in a configuration capable of executing update of a record at a high speed though reference efficiency is somewhat sacrificed, and implement the database 121a-i of the permission apparatus 12-i in a configuration capable of executing reference at a high speed though update efficiency is somewhat sacrificed. Thereby, efficiency as the whole system can be enhanced.

Further, since the permission apparatus 12-i stores setting information which comprises registration identification information corresponding to authority handled by the permission apparatus 12-i itself, it is possible to prevent information corresponding to authority handled by another permission apparatus 12-i' from being leaked to that permission apparatus 12-i. Further, by the plurality of permission apparatuses 12-i handle different authorities, respectively, it is possible to prevent information corresponding to authority handled by each permission apparatus 12-i from being leaked to another permission apparatus 12-i'. Especially, when an intersection of a proper subset constituted by registration identification information corresponding to the authority handled by each permission apparatus 12-i and a proper subset constituted by registration identification information corresponding to the authority handled by another permission apparatus 12-i' is empty, it is possible to prevent information about a subject that is given the authority handled by each permission apparatus 12-i from being leaked to another permission apparatus 12-i'.

Further, since it is possible to perform setting, stop, abolish and the like of authority only by registration of identification information or setting of availability/unavailability information, it is not necessary to deliver a physical medium such as a key by physical means to perform the processes.

Further, in the present embodiment, it is possible to entrust management of a plurality of kinds of authorities to the management apparatus 11. An authority user is not required to hold a separate physical medium for each authority and can exercise a plurality of authorities by at least one terminal apparatus 13.

Second Embodiment

A second embodiment is a modification of the first embodiment. Description will be made below mainly on points of difference from the matters described so far. As for the matters already described, the same reference numerals will be used again, and description thereof will be simplified.

<Configuration>

As illustrated in FIG. 1, a security system 2 of the present embodiment has a management apparatus 21, a permission apparatus 22-i, a terminal apparatus 23, the drive apparatus 14 and the terminal authentication apparatus 15. The management apparatus 21 is configured so as to be capable of performing information transmission with the permission apparatus 22-i and the terminal apparatus 23. The permission apparatus 22-i is configured so as to be capable of performing information transmission with the management apparatus 21 and the terminal authentication apparatus 15. The terminal authentication apparatus 15 is configured so as to be capable of performing information transmission with the permission apparatus 22-i and the terminal apparatus 23. The terminal apparatus 23 is configured so as to be capable of performing information transmission with the terminal authentication apparatus 15 and the management apparatus 21 and capable of transmitting a signal to the drive apparatus 14. In FIG. 1, one management apparatus 21, one permission apparatus 22-i, one terminal apparatus 23, one drive apparatus 14 and one terminal authentication apparatus 15 are shown for convenience of description. However, for each of them, a plurality of apparatuses may exist (FIG. 8). That is, i=1, . . . , N; N is a positive integer, and N may be an integer equal to or larger than 2 (FIG. 8).

<<Management Apparatus 21>>

Figure 10:
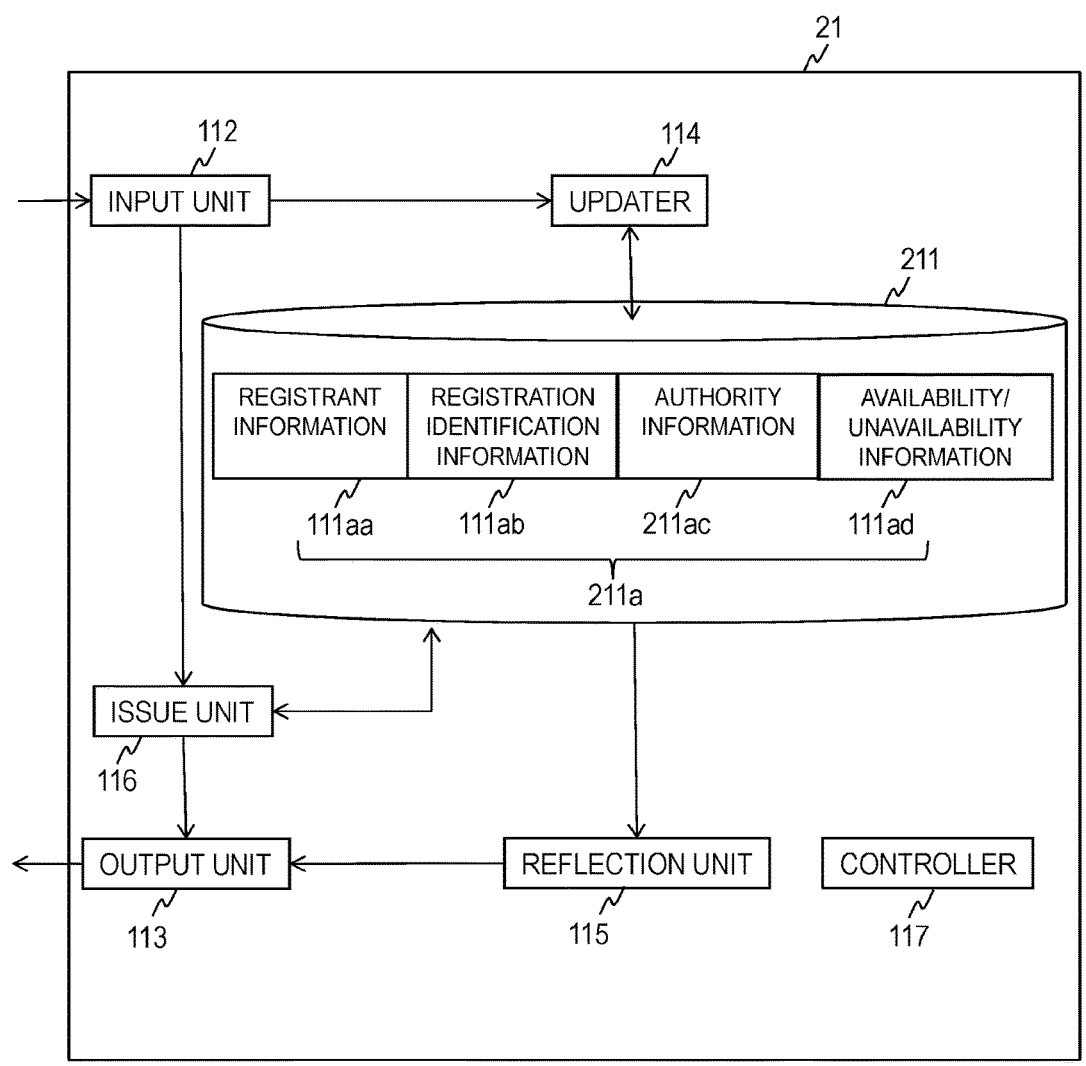
FIG. 10 is a block diagram illustrating a configuration of a management apparatus of an embodiment.

As illustrated in FIG. 10, the management apparatus 21 of the present embodiment has a storage 211, the input unit 112, the output unit 113, the updater 114, the reflection unit 115, the issue unit 116 and the controller 117, and executes each process under the control of the controller 117.

<<Permission Apparatus 22-i>>

Figure 11:
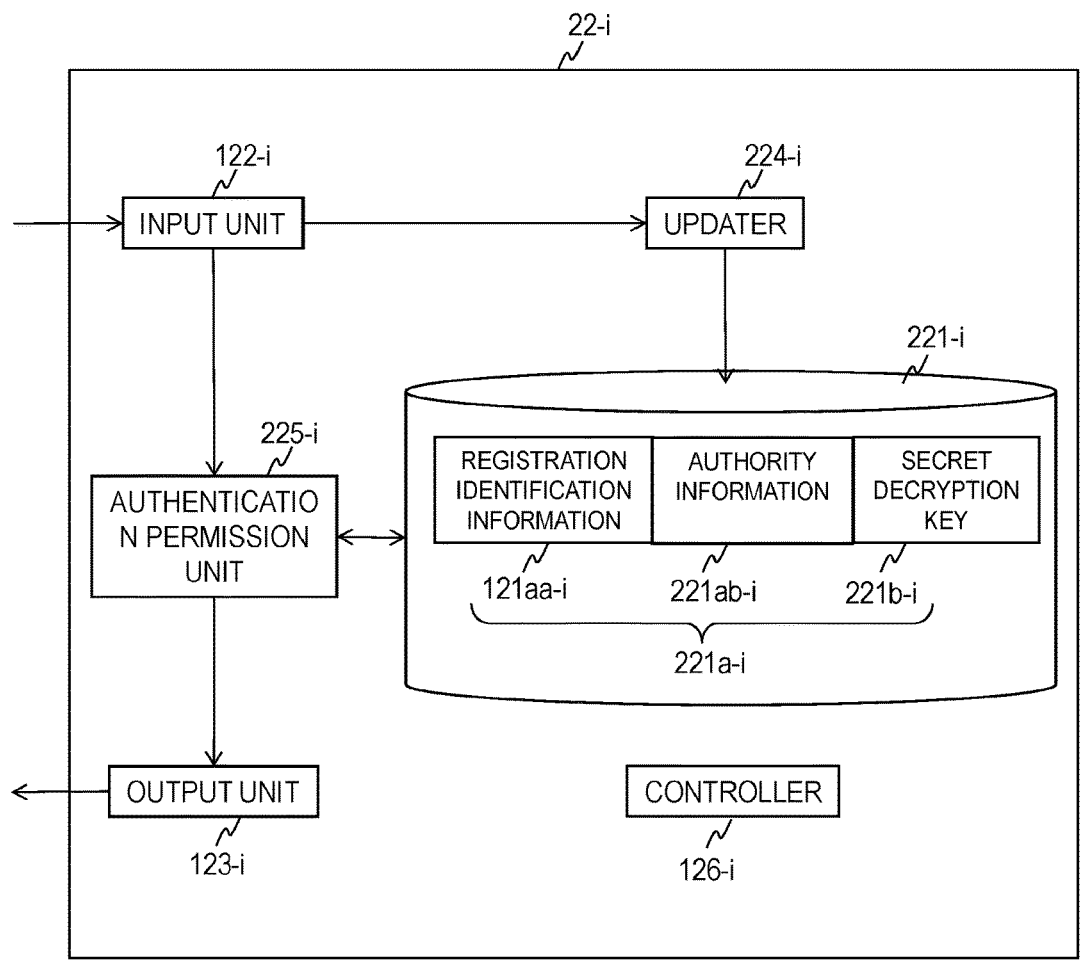
FIG. 11 is a block diagram illustrating a configuration of a permission apparatus of the embodiment.

As illustrated in FIG. 11, the permission apparatus 22-i of the present embodiment includes a storage 221-i, the input unit 122-i, the output unit 123-i, an updater 224-i, an authentication permission unit 225-i and the controller 126-i, and executes each process under the control of the controller 126-i.

<<Terminal Apparatus 23>>

As illustrated in FIG. 4, the terminal apparatus 23 includes the storage 131, the input unit 132, the output unit 133, the interface 134, the registration processor 135, an authority processor 236 and the controller 137, and executes each process under the control of the controller 137.

<Process>

Next, a process of the present embodiment will be described.

<<Generation of Key Pair Corresponding to Authority Information>>

In the present embodiment, the same authority information a(k) is issued to a plurality of subjects (that is, a group constituted by the plurality of subjects), and a key pair (GPK(k), GSK(k)) constituted by a public encryption key GPK(k) and a secret decryption key GSK(k) is generated for authority corresponding to each piece of authority information a(k). Here, k=1, ..., K; and K is an integer equal to or larger than 2. The public encryption key GPK(k) is used to generate authority information 211ac. The secret decryption key GSK(k) is stored in the storage 221-i of a permission apparatus 22-i which handles the authority of the secret decryption key GSK(k) (FIG. 11: secret decryption key 221b-i).

<<Registration Process>>

A registration process performed by the management apparatus 21 (FIG. 10) will be described. In the present embodiment, instead of the database 111a, a database 211a in which the registrant information 111aa, the registration identification information 111ab, the authority information 211ac and the availability/unavailability information 111ad are associated is stored in the storage 211. Here, the authority information 211ac (that is, a(k)) of the present embodiment comprises ciphertext $SENC_{K(j)}(ea(k))$ obtained by encrypting secret information ea(k) required to exercise authority corresponding to the authority information 211ac with a common key K(j) (j=1, ..., J; J is a positive integer), and common key ciphertext $PENC_{GPK(k)}(K(j))$ obtained by encrypting the common key K(j) with a public encryption GPK(k) corresponding to the authority corresponding to the authority information 211ac (for example, a public encryption key corresponding to a group that is given the authority). Furthermore, the authority information 211ac may comprise information identifying the public encryption key GPK(k) corresponding to the authority corresponding thereto. For example, the authority information 211ac is a(k)={GPK(k), $PENC_{GPK(k)}(K(j))$, $SENC_{K(j)}(ea(k))$}. The common key K(j) may be a value randomly generated or may be a value determined in advance. A public encryption key TPK(j) in accordance with the asymmetric key cryptography corresponds to each piece of registration identification information 111ab of the present embodiment. The registration identification information 111ab itself may be the public encryption key TPK(j). The registration identification information 111ab may comprise the public encryption key TPK(j). The registration identification information 111ab may comprise information (a key identifier or the like) identifying the public encryption key TPK(j).

[Illustration of Data Configuration of Database 211a]

Figure 12A:
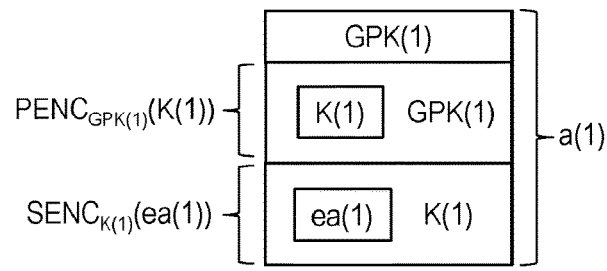
FIGS. 12A and 12B are conceptual diagrams illustrating a configuration of authority information of the embodiment.
Figure 12B:
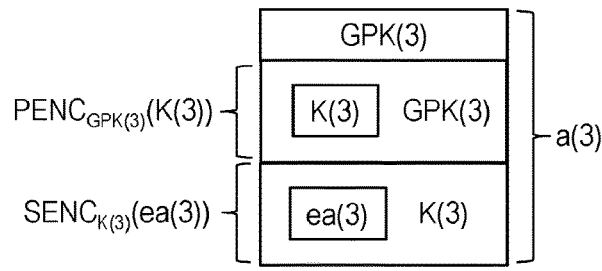

FIGS. 9A, 12A and 12B illustrate a data configuration of the database 211a. A point of difference of the database 211a from the database 111a stated before is that the authority information 111ac stated before is replaced with the authority information 211ac (that is, a(1), ..., a(K)). FIGS. 12A and 12B illustrate pieces of authority information a(1) and a(3) of the present embodiment. The authority information a(1) comprises ciphertext $SENC_{K(1)}(ea(1))$ obtained by encrypting secret information ea(1) required to exercise authority corresponding to the authority information a(1) with a common key K(1), common key ciphertext $PENC_{GPK(1)}(K(1))$ obtained by encrypting the common key K(1) with a public encryption key GPK(1) corresponding to the authority corresponding to the authority information a(1), and the public encryption key GPK(1). The authority information a(3) comprises ciphertext $SENC_{K(3)}(ea(3))$ obtained by encrypting secret information ea(3) required to exercise authority corresponding to the authority information a(3) with a common key K(3), common key ciphertext $PENC_{GPK(3)}(K(3))$ obtained by encrypting the common key K(3) with a public encryption key GPK(3) corresponding to the authority corresponding to the authority information a(3), and the public encryption key GPK(3). The common keys K(1) and K(3) are, for example, random numbers.

Further, authentication information is stored in the storage 131 of the terminal apparatus 23 (FIG. 4) which a subject corresponding to the authentication information uses. In the present embodiment, a secret decryption key corresponding to a public encryption key corresponding to identification information corresponding to this subject is stored in the storage 131. In the case of the example of the database 211a in FIG. 9A, a secret decryption key TSK(j) corresponding to TPK(j) is stored in the storage 131 of the terminal apparatus 23 of the subject A(j). Other processes are the same as steps S11 to S14 of the first embodiment except for that the processes are executed by the terminal apparatus 23 and the management apparatus 21 instead of the terminal apparatus 13 and the management apparatus 11.

<<Identification Information Issue Process>>

An identification information issue process of the present embodiment is the same as the first embodiment except for that the process is executed by the terminal apparatus 23 and the management apparatus 21 instead of the terminal apparatus 13 and the management apparatus 11.

<<Change Process Performed Between Management Apparatus and Terminal Apparatus, Change Process Performed Only by Management Apparatus, and Viewing Process Performed Between Management Apparatus and Terminal Apparatus>>

A change process performed between a management apparatus and a terminal apparatus, a change process performed only by the management apparatus, and a viewing process performed between the management apparatus and the terminal apparatus of the present embodiment are the same as the first embodiment except for that the process is executed by the terminal apparatus 23 and the management apparatus 21 instead of the terminal apparatus 13 and the management apparatus 11, that the storage 211 is used instead of the storage 111, that the database 211a is used instead of the database 111a, and that the authority information 211ac is used instead of the authority information 111ac.

<<Reflection Process Performed Between Management Apparatus and Permission Apparatus>>

A reflection process performed between a management apparatus and a permission apparatus of the present embodiment is the same as the first embodiment except for that the process is executed by the management apparatus 21 and the permission apparatus 22-i instead of the management apparatus 11 and the permission apparatus 12-i, that the storages 211 and 221-i are used instead of the storages 111 and 121-i, that the databases 211a and 221a-i are used instead of the databases 111a and 121a-i; and that the pieces of authority information 211ac and 221ab-i are used instead of the pieces of authority information 111ac and 121ab-i (FIGS. 9B and 9C).

<<Key Use Process: FIG. 7>>

First, the same process as steps S51 to S53 of the first embodiment is executed. However, the process is executed by the terminal apparatus 23 and the permission apparatus 22-i instead of the terminal apparatus 13 and the permission apparatus 12-i; the authentication permission unit 225-i and the storage 221-i are used instead of the authentication permission unit 125-*i* and the storage 121-*i*; and the database 221*a*-*i* is used instead of the database 121*a*-*i*.

Figure 12C:
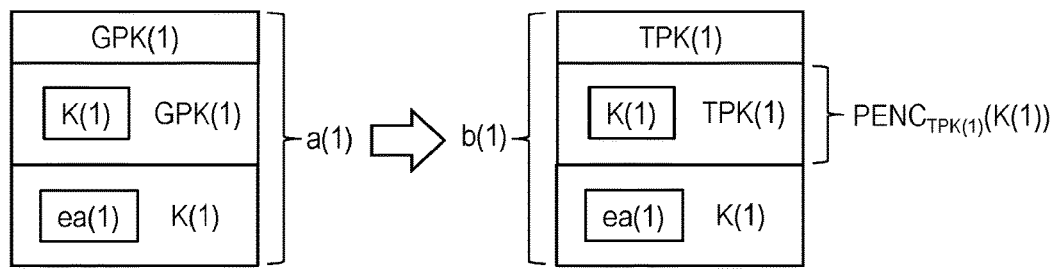
FIGS. 12C and 12D are conceptual diagrams for illustrating re-encryption of the authority information of the embodiment.
Figure 12D:
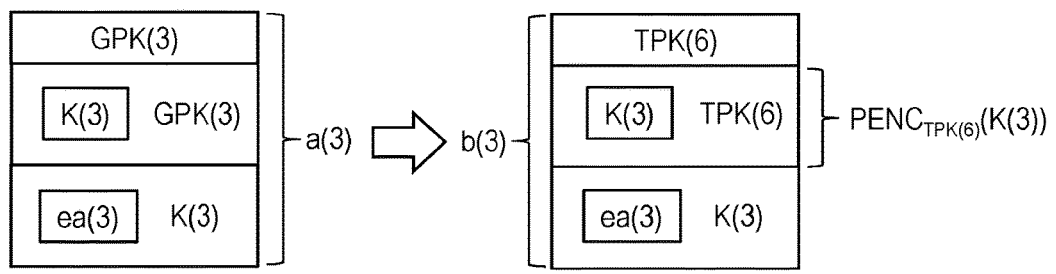

At step S53, when it is judged that identification information does not correspond to registration identification information 121*aa*-*i* comprised in the database 221*a*-*i*, the authentication permission unit 225-*i* returns an error. On the other hand, when the identification information corresponds to registration identification information 121*aa*-*i* (partial registration identification information) comprised in the database 221*a*-*i* (setting information), the authentication permission unit 225-*i* extracts authority information 221*ab*-*i* (that is, a(k)) associated with the registration identification information 121*aa*-*i*. The authentication permission unit 225-*i* extracts a secret decryption key 221*b*-*i* (that is, GSK (k)) corresponding to a public encryption key GPK(k) corresponding to the extracted authority information a(k), from the storage 221-*i*. The authentication permission unit 225-*i* obtains information representing authority exercise information b(k) which comprises common key re-encrypted ciphertext $PENC_{TPK(k)}(K(j))$ obtained by encrypting a common key K(j) comprised in the authority information a(k) with a public encryption key TPK(j) and ciphertext $SENC_{K(j)}(ea(k))$ comprised in the authority information a(k), based on the extracted secret decryption key GSK(k) (for example, a secret decryption key corresponding to a group that is given the authority), a public encryption key TPK(j) corresponding to registration identification information 121*aa*-*i* (partial registration identification information) corresponding to the identification information, and the extracted authority information a(k) (partial authority information). For example, the authentication permission unit 225-*i* decrypts $PENC_{GPK(k)}(K(j))$ with GSK(k) to obtain K(j), encrypts K(j) with TPK(j) to obtain $PENC_{TPK(k)}(K(j))$, and obtains b(k) which comprises $PENC_{TPK(k)}(K(j))$ and $SENC_{K(j)}(ea(k))$. The authority exercise information b(k) may further comprise information representing the public encryption key TPK(j). For example, the authority exercise information is b(k)={TPK(j), $PENC_{TPK(k)}(K(j))$, $SENC_{K(j)}(ea(k))$}. FIG. 12C shows an example in which b(1) is obtained from a(1) in the case of k=j=1, and FIG. 12D shows an example in which b(3) is obtained from a(3) in the case of k=3 and j=6. The authentication permission unit 225-*i* outputs the authority exercise information b(k) to the output unit 123-*i*, and the output unit 123-*i* transmits the authority exercise information b(k) to the terminal authentication apparatus 15 (step S254). The terminal authentication apparatus 15 transmits an error or the authority exercise information b(k) to the terminal apparatus 23 as a response (step S255).

The response (information representing an error or the authority exercise information b(k)) is inputted to (received by) the input unit 132 of the terminal apparatus 23 (FIG. 4) and sent to the authority processor 136. When the authority exercise information b(k) is sent, the authority processor 236 generates drive information corresponding to the authority exercise information b(k). The authority processor 236 of the present embodiment extracts a secret decryption key TSK(j) corresponding to TPK(j) used to generate the authority exercise information b(k) from the storage 131 first. The authority processor 236 decrypts $PENC_{TPK(k)}(K(j))$ which the authority exercise information b(k) has, using the extracted TSK(j) to obtain K(j). Next, the authority processor 236 decrypts $SENC_{K(j)}(ea(k))$ which the authority exercise information b(k) has, using K(j) to extract secret information ea(k), generates drive information corresponding to the secret information ea(k), and sends the drive information to the interface 134. For example, the authority processor 236 causes the secret information ea(k) to be the drive information (step S256). After that, the process of step S57 described in the first embodiment is executed.

Characteristics of the Present Embodiment

In the present embodiment also, it is possible to simplify handling of authority to execute processing for a tangible object similarly to the first embodiment. Further, the authority information 211*ac* of the present embodiment is a(k) which comprises the ciphertext $SENC_{K(j)}(ea(k))$ and the common key ciphertext $PENC_{GPK(k)}(K(j))$, and an apparatus which does not have a secret decryption key GSK(j) corresponding to authority (for example, a secret decryption key corresponding to a group that is given the authority) cannot restore K(j) from a(k) and cannot obtain secret information ea(k). Therefore, even if the authority information 211*ac* is leaked from the management apparatus 21, it can be prevented from happening that the secret information ea(k) is obtained from the authority information 211*ac*, and the drive apparatus 14 is driven by drive information corresponding to the secret information ea(k). Further, since the permission apparatus 22-*i* handling authority corresponding to the authority information a(k) holds TSK(j), it is possible to re-encrypt a(k) to be b(k) which can be decrypted by the terminal apparatus 23 used by a subject A(j) permitted to exercise the authority under management of the permission apparatus 22-*i*. Thereby, the terminal apparatus 23 can decrypt ea(k) from b(k), obtain the drive information and drive the drive apparatus 14. On the other hand, the terminal apparatus 23 does not hold the secret decryption key GSK(j) itself corresponding to the authority and, therefore, can neither decrypt ea(k) nor drive the drive apparatus 14 even the terminal apparatus 23 illegally obtains a(k) which is not based on management of the permission apparatus 22-*i* (for example, management of the group that is given the authority). Thereby, it is possible to perform control for a plurality of subjects that are given the same authority all together under the permission apparatus 22-*i*.

Third Embodiment

A third embodiment is a modification of the second embodiment. In the third embodiment, a self-correction technique is applied to obtain the authority exercise information b(k) from the authority information a(k). The self-correction technique is a technique of always performing correct calculation using a calculator or a system which does not necessarily output a correct calculation result (outputting a correct calculation result in the case of using a calculator which outputs a correct calculation result, and obtaining a correct calculation result or a result representing that calculation is impossible in the case of using a calculator which does not necessarily output a correct result). The self-correction technique itself is a well-known technique and is disclosed, for example, in Reference literature 1 (International Publication No. WO/2012/057134), Reference literature 2 (International Publication No. WO/2011/086992) and Reference literature 3 (International Publication No. WO/2012/121152) and the like. The present embodiment illustrates an invention on a method of applying this self-correction technique to authority management. In the present embodiment, a key management apparatus for each permission apparatus or for each authority is provided which stores a secret decryption key GSK(k) corresponding to each authority. When inputted identification information corresponds to registration identification information 121*aa*-*i*

(partial registration identification information) comprised in the database 221a-i (setting information), the permission apparatus transmits information corresponding to authority information a(k) (partial authority information) and a public encryption key TPK(j) to the key management apparatus which stores a secret decryption key GSK(k). The key management apparatus to which the information corresponding to the authority information a(k) (partial authority information) and the public encryption key TPK(j) have been sent uses the information corresponding to the authority information a(k) (partial authority information), the public encryption key TPK(j) and the secret decryption key GSK(k) to obtain information corresponding to authority exercise information b(k) and transmits the information to the permission apparatus. The permission apparatus receives the information corresponding to the authority exercise information b(k) and obtains the authority exercise information b(k) by a self-correction process using the information corresponding to the authority exercise information b(k).

<Configuration>

As illustrated in FIG. 1, a security system 3 of the present embodiment has the management apparatus 21, a permission apparatus 32-i, the terminal apparatus 23, the drive apparatus 14, the terminal authentication apparatus 15 and a key management apparatus 36-i. The management apparatus 21 is configured so as to be capable of performing information transmission with the permission apparatus 32-i and the terminal apparatus 23. The permission apparatus 32-i is configured so as to be capable of performing information transmission with the key management apparatus 36-i, the management apparatus 21 and the terminal authentication apparatus 15. The terminal authentication apparatus 15 is configured so as to be capable of performing information transmission with the permission apparatus 32-i and the terminal apparatus 23. The terminal apparatus 23 is configured so as to be capable of information transmission with the terminal authentication apparatus 15 and the management apparatus 21 and capable of transmitting a signal to the drive apparatus 14. In FIG. 1, one management apparatus 21, one permission apparatus 32-i, one key management apparatus 36-i, one terminal apparatus 23, one drive apparatus 14 and one terminal authentication apparatus 15 are shown for convenience of description. However, for each of them, a plurality of apparatuses may exist (FIG. 8). That is, i=1, . . . , N; N is a positive integer; and N may be an integer equal to or larger than 2 (FIG. 8).

<<Permission Apparatus 32-i>>

Figure 13A:
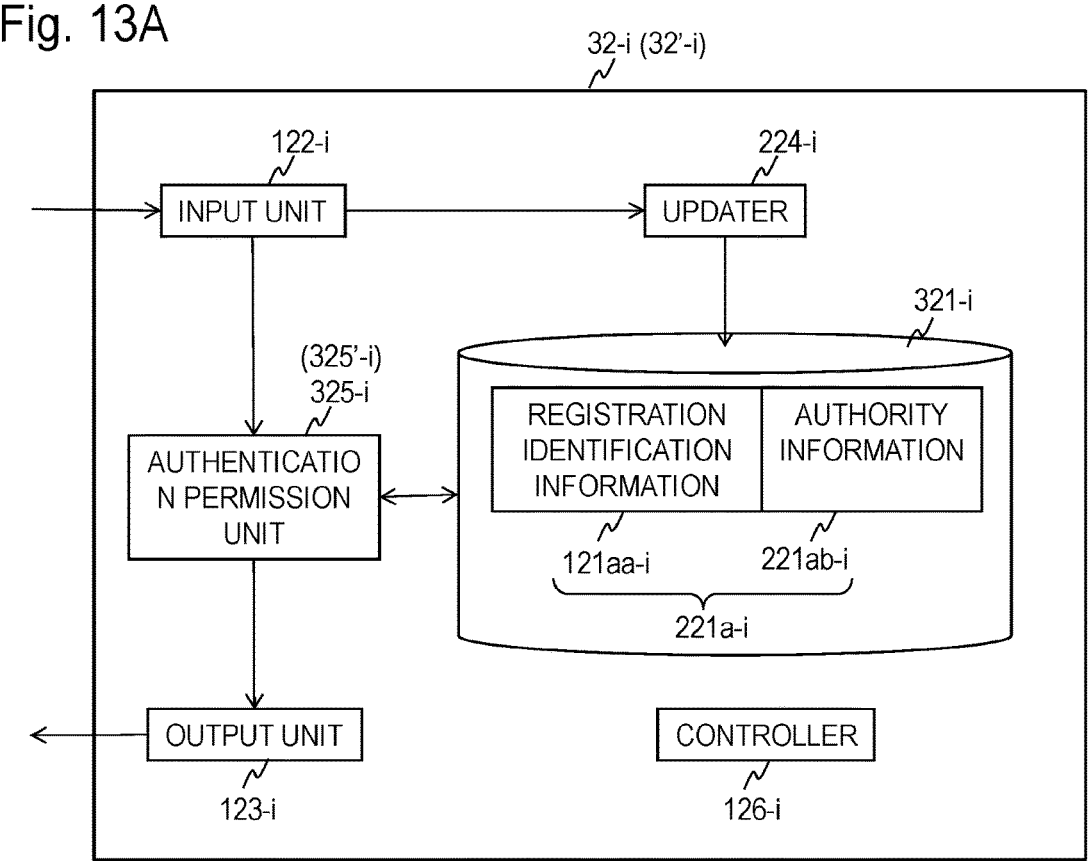
FIG. 13A is a block diagram illustrating a configuration of the permission apparatus of the embodiment.

As illustrated in FIG. 13A, the permission apparatus 32-i of the present embodiment has a storage 321-i, the input unit 122-i, the output unit 123-i, an updater 224-i, an authentication permission unit 325-i and the controller 126-i, and executes each process under the control of the controller 126-i.

<<Key Management Apparatus 36-i>>

Figure 13B:
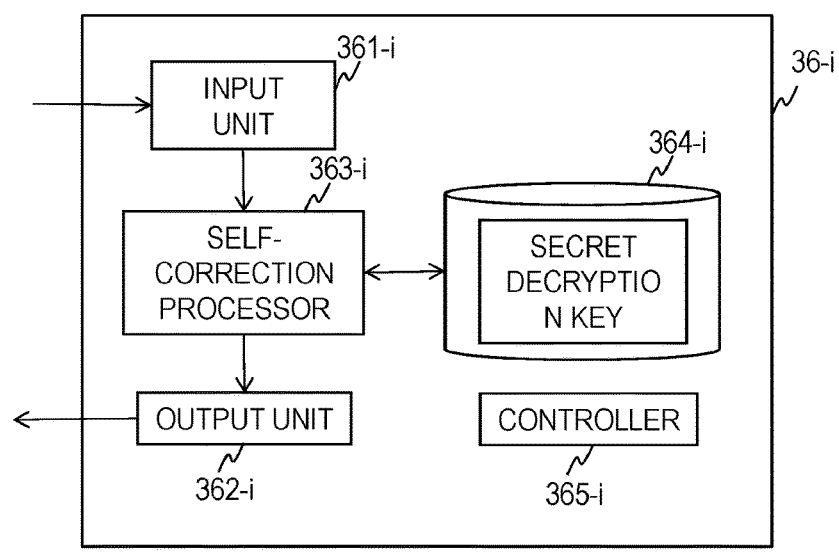
FIG. 13B is a block diagram illustrating a configuration of a key management apparatus of the embodiment.

As illustrated in FIG. 13B, the key management apparatus 36-i of the present embodiment includes an input unit 361-i, an output unit 362-i, a self-correction processor 363-i, a storage 364-i and a controller 365-i, and executes each process under the control of the controller 365-i.

<Process>

Points of difference of the process of the present embodiment from the second embodiment are that the secret decryption key GSK(k) generated by <<Generation of key pair corresponding to authority information>> is stored in the storage 364-i of the key management apparatus 36-i (FIG. 13B) instead of being stored in the storage 221-i of the permission apparatus 22-i which handles authority for the secret decryption key GSK(k), and that step S354 is executed (FIG. 7) instead of step S254. Only step S354 will be described below.

<<Step S354>>

At step S53, when it is judged that identification information does not correspond to registration identification information 121aa-i comprised in the database 221a-i, the authentication permission unit 325-i of the permission apparatus 32-i (FIG. 13A) returns an error. On the other hand, when the identification information corresponds to registration identification information 121aa-i (partial registration identification information) comprised in the database 221a-i (setting information), the authentication permission unit 325-i extracts authority information 221ab-i associated with the registration identification information 121aa-i (that is, a(k)) and a public encryption key TPK(j) corresponding to the registration identification information 121aa-i. For example, when the registration identification information 121aa-i itself is TPK(j), the registration identification information 121aa-i is extracted as TPK(j). The authentication permission unit 325-i sends information C(k) corresponding to a(k) and TPK(j) to the output unit 123-i. Specific examples of C(k) will be described later. The output unit 123-i transmits C(k) and TPK(j) to the key management apparatus 36-i (step S3541).

C(k) and TPK(j) are received by the input unit 361-i of the key management apparatus 36-i (FIG. 13B) and sent to the self-correction processor 363-i. The self-correction processor 363-i uses C(k), TPK(j), and GSK(k) read from the storage 364-i to obtain and output information $Z(k)=F(C(k), TPK(j), GSK(k))$ corresponding to authority exercise information b(k). Specific example of Z(k) will be described later. Z(k) is sent to the output unit 362-i, and it is transmitted to the permission apparatus 32-i from the output unit 362-i (step S3542).

Z(k) is received by the input unit 122-i of the permission apparatus 32-i and sent to the authentication permission unit 325-i. The authentication permission unit 325-i obtains the authority exercise information b(k) by a self-correction process using Z(k) and outputs the authority exercise information b(k). The output unit 123-i transmits this authority exercise information b(k) to the terminal authentication apparatus 15 (step S3543).

<<Specific Example 1 of C(k) and Z(k)>>

A specific example 1 of C(k) and Z(k) will be shown. In this example, G and H represent groups (for example, cyclic groups), $\mu_h$ represents a generator of the group H, $PENC_{GPK(k)}(K(j))$ represents an element of the group G, f represents a re-encryption function to obtain $PENC_{TPK(k)}(K(j)) \in G$ for an input $PENC_{GPK(k)}(K(j)) \in H$ using TPK(j) and GSK(k), $X_1$ and $X_2$ represent random variables having values in the group G, $x_1$ represents a realization of the random variable $X_1$, $x_2$ represents a realization of the random variable $X_2$, and a and b are natural numbers which are relatively prime. One of a and b may be a constant such as 1.

At step S3541, the authentication permission unit 325-i obtains $\tau_1$ and/or $\tau_2$ corresponding to $PENC_{GPK(k)}(K(j))$ as C(k), and the output unit 123-i transmits C(k) and TPK(j) to the key management apparatus 36-i. For example, $\tau_1$ further corresponds to b, and $\tau_2$ further corresponds to a. For example, $\tau_1$ and/or $\tau_2$ is such information that the relationship with $PENC_{GPK(k)}(K(j))$ is disturbed.

At step S3542, the self-correction processor 363-i outputs $z_1$ and/or $z_2$ as Z(k). Here, $z_1=f(\tau_1)$ or $z_1 \neq f(\tau_1)$ is satisfied, and $z_2=f(\tau_2)$ or $z_2 \neq f(\tau_2)$ is satisfied. There may be a case where $z_1=f(\tau_1)$ is satisfied, and there may be a case where $z_1=f(\tau_1)$ is not satisfied. There may be a case where $z_2=f(\tau_2)$ is satisfied, and there may be a case where $z_2=f(\tau_2)$ is not satisfied. That is, the self-correction processor 363-$i$ correctly calculates $f(\tau_1)$ with a probability larger than a certain probability and causes an obtained calculation result to be $z_1$; and correctly calculates $f(\tau_2)$ with a probability larger than a certain probability and causes an obtained calculation result to be $z_2$. The "certain probability" is a probability below 100%. An example of the "certain probability" is a probability which cannot be ignored, and an example of the "probability which cannot be ignored" is a probability equal to or above $1/\psi(k)$ where $\psi(k)$ is a polynomial expression of a non-decreasing function for a security parameter k. That is, the self-correction processor 363-$i$ outputs a calculation result which comprises an intentional or unintentional error. The output unit 362-$i$ transmits Z(k) to the permission apparatus 32-$i$.

At step S3543, the authentication permission unit 325-$i$ outputs $u^{b'}v^{a'}$ corresponding to $u=f(x)^b x_1$ and $v=f(x)^a x_2$ satisfying $u^a=v^b$ as $PENC_{TPK(k)}(K(j))$. Here, a' and b' are integers satisfying a'a+b'b=1. When $PENC_{TPK(k)}(K(j))$ is obtained, the authentication permission unit 325-$i$ obtains and outputs b(k) which comprises this $PENC_{TPK(k)}(K(j))$ and $SENC_{K(j)}(ea(k))$ comprised in a(k). When $z_1$ and/or $z_2$ satisfying $u^a=v^b$ has not been obtained, the authentication permission unit 325-$i$ outputs error information representing that b(k) cannot be obtained.

<<Specific Example 2 of C(k) and Z(k)>>

A specific example 2 of C(k) and Z(k) will be shown. In this example, G and H represent commutative groups (for example, cyclic groups), $\mu_h$ represents a generator of the group H, $v=f(\mu_h)$, the $PENC_{GPK(k)}(K(j))$ is an element of the group H, the $PENC_{TPK(k)}(K(j))$ is an element of the group G, f represents a homomorphic re-encryption function to obtain $PENC_{TPK(k)}(K(j)) \in G$ for an input $PENC_{GPK(k)}(K(j)) \in H$ using TPK(j) and GSK(k), $X_1$ and $X_2$ represent random variables having values in the group G, $x_1$ represents a realization of the random variable $X_1$, $x_2$ represents a realization of the random variable $X_2$, r1 and r2 are random natural numbers equal to or larger than 0, and a and b are natural numbers which are relatively prime. One of a and b may be a constant such as 1.

At step S3541, the authentication permission unit 325-$i$ obtains $\tau_1=\mu_h^{r1}\{(PENC_{GPK(k)}(K((j)))\}^b$ and/or $\tau_2=\mu_h^{r2}\{PENC_{GPK(k)}(K(j)))\}^a$ as C(k), and the output unit 123-$i$ transmits C(k) and TPK(j) to the key management apparatus 36-$i$.

At step S3542, the self-correction processor 363-$i$ outputs $z_1$ and/or $z_2$ as Z(k). Here, $z_1=f(\tau_1)$ or $z_1 \neq f(\tau_1)$ is satisfied, and $z_2=f(\tau_2)$ or $z_2 \neq f(\tau_2)$ is satisfied. There may be a case where $z_1=f(\tau_1)$ is satisfied, and there may be a case where $z_1=f(\tau_1)$ is not satisfied. There may be a case where $z_2=f(\tau_2)$ is satisfied, and there may be a case where $z_2=f(\tau_2)$ is not satisfied.

At step S3543, the authentication permission unit 325-$i$ outputs $u^{b'}v^{a'}$ corresponding to $u=z_1v^{-r1}$ and $v=z_2v^{-r2}$ satisfying $u^a=v^b$ as $PENC_{TPK(k)}(K(j))$. Here, a' and b' are integers satisfying a'a+b'b=1. When $PENC_{TPK(k)}(K(j))$ is obtained, the authentication permission unit 325-$i$ obtains and outputs b(k) which comprises this $PENC_{TPK(k)}(K(j))$ and $SENC_{K(j)}(ea(k))$ comprised in a(k). When $z_1$ and/or $z_2$ satisfying $u^a=v^b$ has not been obtained, the authentication permission unit 325-$i$ outputs error information representing that b(k) cannot be obtained.

Characteristics of the Present Embodiment

In the present embodiment also, it is possible to simplify handling of authority to execute processing for a tangible object similarly to the first embodiment. Further, in the present embodiment, since the self-correction technique is applied to obtain b(k) from a(k), it is not necessary for a permission apparatus to hold GSK(k). Further, even if a key management apparatus performs illegal processing or even if illegal processing intervenes between the permission apparatus and the key management apparatus, it does not happen that the permission apparatus acquires a wrong value as b(k). Thereby, it is possible to prevent an attack to illegally drive the drive apparatus 14 (for example, unlocking the door of an unintended locker instead of the door of an intended locker).

Modification of Third Embodiment

In the third embodiment, the self-correction process is performed between the permission apparatus 32-$i$ and the key management apparatus 36-$i$. The self-correction process, however, may be performed between a terminal apparatus and the key management apparatus 36-$i$. This modification will be described.

<Configuration>

As illustrated in FIG. 1, a security system 3' of this modification is such that the permission apparatus 32-$i$ of the security system 3 is replaced with a permission apparatus 32'-$i$, and the terminal apparatus 23 is replaced with a terminal apparatus 33'.

<<Permission Apparatus 32'-$i$>>

As illustrated in FIG. 13A, the permission apparatus 32'-$i$ of the present embodiment has a storage 321-$i$, the input unit 122-$i$, the output unit 123-$i$, the updater 224-$i$, an authentication permission unit 325'-$i$ and the controller 126-$i$, and executes each process under the control of the controller 126-$i$.

<<Terminal Apparatus 33'>>

As shown in FIG. 4, the terminal apparatus 33' has the storage 131, the input unit 132, the output unit 133, the interface 134, the registration processor 135, an authority processor 336' and the controller 137, and executes each process under the control of the controller 137.

<Process>

A point of difference of this modification from the third embodiment is that steps 354', S355' and S356' are executed instead of steps S354, S255 and S256. Only steps S354', S355' and S356' will be described below.

At step S53, when it is judged that identification information does not correspond to registration identification information 121aa-$i$ comprised in the database 221a-$i$, the authentication permission unit 325'-$i$ of the permission apparatus 32'-$i$ (FIG. 13A) returns an error. On the other hand, when the identification information corresponds to registration identification information 121aa-$i$ (partial registration identification information) comprised in the database 221a-$i$ (setting information), the authentication permission unit 325'-$i$ extracts authority information 221ab-$i$ (that is, partial authority information a(k)) associated with the registration identification information 121aa-$i$, and a public encryption key TPK(j) corresponding to the registration identification information 121aa-$i$. The extracted authority information 221ab-$i$ and public encryption key TPK(j) are outputted from the output unit 123-$i$ (step S354') and transmitted to the terminal apparatus 33' via the terminal authentication apparatus 15 (step S355').

After that, step S356' below constituted by steps S3561' to 3563' is executed. First, the authority information 221ab-$i$ (that is, a(k)) and the public encryption key TPK(j) are received by the input unit 132 of the terminal apparatus 33'

(FIG. 4) and sent to the authority processor 336'. The authority processor 336' sends information C(k) corresponding to the partial authority information a(k) and the public encryption key TPK(j) to the output unit 133. Specific examples of C(k) are as described in the third embodiment. The output unit 133 transmits C(k) and TPK(j) to the key management apparatus 36-i (step S3561').

C(k) and TPK(j) are received by the input unit 361-i of the key management apparatus 36-i (FIG. 13B) and sent to the self-correction processor 363-i. The self-correction processor 363-i uses the information C(k) corresponding to the partial authority information a(k), the public encryption key TPK(j), and a secret decryption key GSK(k) read from the storage 364-i to obtain and output information Z(k)=F(C(k), TPK(j), GSK(k)) corresponding to authority exercise information b(k). Specific examples of Z(k) are as described in the third embodiment. Z(k) is sent to the output unit 362-i, and it is transmitted to the terminal apparatus 33' from the output unit 362-i (step S3562').

Z(k) is received by the input unit 132 of the terminal apparatus 33' (FIG. 4) and sent to the authority processor 336'. The authority processor 336' obtains the authority exercise information b(k) by the self-correction process using Z(k). A specific example of this process is as described in the third embodiment. The authority processor 336' generates drive information corresponding to the authority exercise information b(k). The authority processor 336' of this modification extracts a secret decryption key TSK(j) corresponding to TPK(j) used to generate the authority exercise information b(k) from the storage 131. The authority processor 336' decrypts $PENC_{TPK(k)}(K(j))$ which the authority exercise information b(k) has, using the extracted TSK(j) to obtain K(j). Next, the authority processor 336' decrypts $SENC_{K(j)}(ea(k))$ which the authority exercise information b(k) has, using K(j) to extract secret information ea(k), generates drive information corresponding to the secret information ea(k), and sends the drive information to the interface 134. For example, the authority processor 336' causes the secret information ea(k) to be the drive information (step S3563'). After that, the process of step S57 described in the first embodiment is executed.

Modification and the Like

The present invention is not limited to the embodiments described above. For example, in the embodiments described above, registration identification information, authority information and availability/unavailability information are associated in a database stored in a management apparatus, and a permission apparatus receives only information representing registration identification information associated with availability/unavailability information representing permission to exercise authority. However, the database stored in the management apparatus may not comprise availability/unavailability information, and the permission apparatus may receive registration identification information associated with only pieces of authority information corresponding to a part of authorities handled by the permission apparatus.

Further, in the embodiments described above, the database stored in the management apparatus is constituted by records in which registrant information, registration identification information, authority information and availability/unavailability information are associated. However, the database stored in the management apparatus may be constituted by other records in which at least registration identification information and authority information are associated.

Further, the permission apparatus itself may generate authority information. The terminal apparatus itself may generate authority information.

In addition, at least a partial combination of apparatuses may exchange information via portable recording media without each of the apparatuses exchanging information through a network. Otherwise, at least a partial combination of the apparatuses may exchange information via non-portable recording media. That is, a combination constituted by a part of these apparatuses may be the same apparatus. In other words, a plurality of applications among the applications described above may be executed on the same computer.

The various kinds of processes described above are not only executed in a time series in accordance with the description but also may be executed in parallel or individually according to the processing capacities of the apparatuses which execute the processes or as needed. In addition, it goes without saying that a change can be appropriately made within a range not departing from the spirit of the present invention.

In the case of realizing the configuration described above by a computer, processing details of a function which each apparatus is to be provided with are written in a program. By executing the program on the computer, the processing functions are realized on the computer. The program in which the processing details are written can be recorded in a computer-readable recording medium. An example of the computer-readable recording medium is a non-transitory recording medium. Examples of such a recording medium are: a magnetic recording device, an optical disk, a magneto-optical recording medium, and a semiconductor memory.

Distribution of this program is performed, for example, by selling, transferring or lending a portable recording medium, such as a DVD and a CD-ROM, in which the program is recorded. Furthermore, a configuration is also possible in which this program is stored in a storage apparatus such as a server computer and transferred from the server computer to other computers via a network to distribute the program.

For example, the computer which executes such a program stores the program recorded in a portable recording medium or transferred from a server computer into its storage device once first. At the time of executing a process, this computer reads the program stored in its storage device and executes the process in accordance with the read program. As different forms of executing the program, the computer may read the program directly from the portable recording medium and execute the process in accordance with the program, and, furthermore, it is also possible to, each time a program is transferred to this computer from the server computer, successively execute a process in accordance with the received program. A configuration is also possible in which the program is not transferred to the computer from the server computer but the processes described above are executed by a so-called ASP (Application Service Provider) type service for realizing a processing function only by an instruction to execute the program and acquisition of a result.

DESCRIPTION OF REFERENCE NUMERALS

1,2,3,3': security system
11,21: management apparatus
12-i,22-i,32-i,32-i': permission apparatus 13,23,33': terminal apparatus
14: drive apparatus
15: terminal authentication apparatus
36-*i*: key management apparatus

What is claimed is:

1. A security system comprising:
a management apparatus storing a database in which authority information corresponding to authority to physically drive a drive apparatus, which is a tangible object, using a terminal apparatus, and registration identification information corresponding to a subject that is given the authority are associated, a plurality of pieces of the authority information and a plurality of pieces of the registration identification information being associated in the database, and outputting information representing any of the registration identification information; and
a first permission apparatus receiving information representing first partial registration identification information which is elements of a first proper subset of a universal set constituted by the plurality of pieces of the registration identification information, storing setting information comprising the information representing the first partial registration identification information, receiving information representing identification information which is output from a first terminal apparatus and, when the identification information corresponds to the first partial registration identification information comprised in the setting information, outputting information representing first authority exercise information required to exercise the authority corresponding to first partial authority information which is the authority information associated with the first partial registration identification information, the information representing the first authority exercise information being input to the first terminal apparatus which outputs a first drive signal corresponding to the first authority exercise information, the first drive signal being a signal for physically driving a first drive apparatus; and
a second permission apparatus receiving information representing second partial registration identification information which is elements of a second proper subset of the universal set, storing second setting information comprising the information representing the second partial registration identification information, receiving information representing second identification information which is output from a second terminal apparatus and, when the second identification information corresponds to the second partial registration identification information comprised in the second setting information, outputting information representing second authority exercise information required to exercise authority corresponding to second partial authority information which is the authority information associated with the second partial registration identification information, the information representing the second authority exercise information being input to the second terminal apparatus which outputs a second drive signal corresponding to the second authority exercise information, the second drive signal being a signal for physically driving a second drive apparatus; wherein
an intersection of the first proper subset and the second proper subset is empty; and
the first partial authority information is different from the second partial authority information.

2. The security system according to claim 1, wherein
the registration identification information comprises a public encryption key in accordance with asymmetric key cryptography; and
the first authority exercise information is ciphertext obtained by encrypting secret information required to exercise the authority, using the registration identification information corresponding to the identification information.

3. A security system comprising:
a management apparatus storing a database in which authority information corresponding to authority to physically drive a drive apparatus, which is a tangible object, using a terminal apparatus, and registration identification information corresponding to a subject that is given the authority are associated, and outputting information representing any of the registration identification information; and
a first permission apparatus receiving the information representing any of the registration identification information, storing setting information comprising the information representing any of the registration identification information, receiving information representing identification information, and, when the identification information corresponds to any of the registration identification information comprised in the setting information, outputting information representing first authority exercise information required to exercise the authority, wherein
first partial authority information is the authority information corresponding to a part of authorities that the first permission apparatus handles;
the first permission apparatus receives information representing first partial registration identification information, which is the registration identification information associated with the first partial authority information, and stores the setting information comprising the first partial registration identification information, wherein
the first partial authority information comprises first ciphertext obtained by encrypting first secret information required to exercise authority corresponding to the first partial authority information with a first common key, and first common key ciphertext obtained by encrypting the first common key with a first public encryption key corresponding to the authority corresponding to the first partial authority information; and
the first permission apparatus stores the first partial authority information, and, when the identification information corresponds to the first partial registration identification information comprised in the setting information, outputs information representing the first authority exercise information obtained based on a first secret decryption key corresponding to the first public encryption key, a third public encryption key corresponding to the first partial registration identification information and the first partial authority information, the information representing the first authority exercise information comprising first common key re-encrypted ciphertext obtained by encrypting the first common key with the third public encryption key and the first ciphertext.

4. The security system according to claim 3, comprising a first key management apparatus storing the first secret decryption key, wherein
when the identification information corresponds to the first partial registration identification information comprised in the setting information, the first permission apparatus outputs the third public encryption key and information corresponding to the first partial authority information;

when the third public encryption key and the information corresponding to the first partial authority information are sent, the first key management apparatus uses the information corresponding to the first partial authority information, the third public encryption key, and the first secret decryption key to obtain and output information corresponding to the first authority exercise information; and the first permission apparatus receives the information corresponding to the first authority exercise information and obtains the first authority exercise information by a self-correction process using the information corresponding to the first authority exercise information.

5. A security system comprising:

a management apparatus storing a database in which authority information corresponding to authority to physically drive a drive apparatus, which is a tangible object, using a terminal apparatus, and registration identification information corresponding to a subject that is given the authority are associated, and outputting information representing any of the registration identification information;

a first permission apparatus receiving the information representing any of the registration identification information, storing setting information comprising the information representing any of the registration identification information, receiving information representing identification information, and, when the identification information corresponds to any of the registration identification information comprised in the setting information, outputting information representing first authority exercise information required to exercise the authority;

the terminal apparatus; and a first key management apparatus, wherein first partial authority information is the authority information corresponding to a part of authorities that the first permission apparatus handles;

the first permission apparatus receives information representing first partial registration identification information, which is the registration identification information associated with the first partial authority information, and stores the setting information comprising the first partial registration identification information;

the first partial authority information comprises first ciphertext obtained by encrypting first secret information required to exercise authority corresponding to the first partial authority information with a first common key, and first common key ciphertext obtained by encrypting the first common key with a first public encryption key corresponding to the authority corresponding to the first partial authority information; and the first key management apparatus stores a first secret decryption key corresponding to the first public encryption key;

the first permission apparatus stores the first partial authority information and, when the identification information corresponds to the first partial registration identification information comprised in the setting information, outputs the first partial authority information;

the terminal apparatus outputs information corresponding to the first partial authority information and a third public encryption key corresponding to the first partial registration identification information;

when the third public encryption key and the information corresponding to the first partial authority information are sent, the first key management apparatus uses the information corresponding to the first partial authority information, the third public encryption key, and the first secret decryption key to obtain and output information corresponding to the first authority exercise information comprising first common key re-encrypted ciphertext obtained by encrypting the first common key with the third public encryption key and the first ciphertext; and the terminal apparatus receives the information corresponding to the first authority exercise information and obtains the first authority exercise information by a self-correction process using the information corresponding to the first authority exercise information.

6. A security method comprising the steps of:

outputting information representing any of registration identification information from a management apparatus, the management apparatus storing a database in which authority information corresponding to authority to physically drive a drive apparatus, which is a tangible object, using a terminal apparatus, and the registration identification information corresponding to a subject that is given the authority are associated, a plurality of pieces of the authority information and a plurality of pieces of the registration identification information being associated in the database;

receiving information representing first partial registration identification information which is elements of a first proper subset of a universal set constituted by the plurality of pieces of the registration identification information, and storing setting information comprising the information representing the first partial registration identification information, at a first permission apparatus; and receiving information representing identification information which is output from a first terminal apparatus and, when the identification information corresponds to the first partial registration identification information comprised in the setting information, outputting information representing authority exercise information required to exercise the authority corresponding to first partial authority information which is the authority information associated with the first partial registration identification information, the information representing the first authority exercise information being input to the first terminal apparatus which outputs a first drive signal corresponding to the first authority exercise information, the first drive signal being a signal for physically driving a first drive apparatus, at the first permission apparatus;

receiving information representing second partial registration identification information which is elements of a second proper subset of the universal set, and storing second setting information comprising the information representing the second partial registration identification information, at a second permission apparatus;

receiving information representing second identification information which is output from a second terminal apparatus and, when the second identification information corresponds to the second partial registration identification information comprised in the second setting information, outputting information representing second authority exercise information required to exercise authority corresponding to second partial authority information which is the authority information associated with the second partial registration identification information, the information representing the second authority exercise information being input to the second terminal apparatus which outputs a second drive signal corresponding to the second authority exercise information, the second drive signal being a signal for physically driving a second drive apparatus, at the second permission apparatus; wherein an intersection of the first proper subset and the second proper subset is empty; and the first partial authority information is different from the second partial authority information.

7. A security method comprising the steps of:

outputting information representing any of registration identification information from a management apparatus, the management apparatus storing a database in which authority information corresponding to authority to physically drive a drive apparatus, which is a tangible object, using a terminal apparatus, and registration identification information corresponding to a subject that is given the authority are associated, a plurality of pieces of the authority information and a plurality of pieces of the registration identification information being associated in the database;

receiving the information representing any of the registration identification information, storing setting information comprising the information representing any of the registration identification information, at a first permission apparatus; and receiving information representing identification information, and, when the identification information corresponds to any of the registration identification information comprised in the setting information, outputting information representing first authority exercise information required to exercise the authority, at the first permission apparatus, wherein first partial authority information is the authority information corresponding to a part of authorities that the first permission apparatus handles;

the first permission apparatus receives information representing first partial registration identification information, which is the registration identification information associated with the first partial authority information, and stores the setting information comprising the first partial registration identification information, wherein the first partial authority information comprises first ciphertext obtained by encrypting first secret information required to exercise authority corresponding to the first partial authority information with a first common key, and first common key ciphertext obtained by encrypting the first common key with a first public encryption key corresponding to the authority corresponding to the first partial authority information; and the first permission apparatus stores the first partial authority information, and, when the identification information corresponds to the first partial registration identification information comprised in the setting information, outputs information representing the first authority exercise information obtained based on a first secret decryption key corresponding to the first public encryption key, a third public encryption key corresponding to the first partial registration identification information and the first partial authority information, the information representing the first authority exercise information comprising first common key re-encrypted ciphertext obtained by encrypting the first common key with the third public encryption key and the first ciphertext.

8. A security method comprising the steps of:

outputting information representing any of registration identification information from a management apparatus, the management apparatus storing a database in which authority information corresponding to authority to physically drive a drive apparatus, which is a tangible object, using a terminal apparatus, and registration identification information corresponding to a subject that is given the authority are associated, a plurality of pieces of the authority information and a plurality of pieces of the registration identification information being associated in the database;

receiving the information representing any of the registration identification information, and storing setting information comprising the information representing any of the registration identification information, at a first permission apparatus; and receiving information representing identification information, and, when the identification information corresponds to any of the registration identification information comprised in the setting information, outputting information representing first authority exercise information required to exercise the authority, the first permission apparatus; wherein first partial authority information is the authority information corresponding to a part of authorities that the first permission apparatus handles;

the security method further comprising the steps of:

receiving information representing first partial registration identification information, which is the registration identification information associated with the first partial authority information, and stores the setting information comprising the first partial registration identification information, at the first permission apparatus, wherein the first partial authority information comprises first ciphertext obtained by encrypting first secret information required to exercise authority corresponding to the first partial authority information with a first common key, and first common key ciphertext obtained by encrypting the first common key with a first public encryption key corresponding to the authority corresponding to the first partial authority information;

storing a first secret decryption key corresponding to the first public encryption key at a first key management apparatus;

storing the first partial authority information and, when the identification information corresponds to the first partial registration identification information comprised in the setting information, outputting the first partial authority information, at the first permission apparatus;

outputting information corresponding to the first partial authority information and a third public encryption key corresponding to the first partial registration identification information at the terminal apparatus;

when the third public encryption key and the information corresponding to the first partial authority information are sent, using the information corresponding to the first partial authority information, the third public encryption key, and the first secret decryption key to obtain and output information corresponding to the first authority exercise information comprising first common key re-encrypted ciphertext obtained by encrypting the first common key with the third public encryption key and the first ciphertext, at the first key management apparatus; and receiving the information corresponding to the first authority exercise information and obtaining the first authority exercise information by a self-correction process using the information corresponding to the first authority exercise information at the terminal apparatus.

* * * * *